United States Patent [19]

Osterlund et al.

[11] 4,037,208

[45] July 19, 1977

[54] HAMMER INTENSITY SELECTION APPARATUS FOR SERIAL PRINTER

[75] Inventors: Alfred G. Osterlund, Los Gatos; Frank D. Ruble, Fremont, both of Calif.

[73] Assignee: Xerox Corporation, Stamford, Conn.

[21] Appl. No.: 682,949

[22] Filed: May 3, 1976

[51] Int. Cl.[2] .......................... G06F 3/12; G06F 9/16; B41J 9/00

[52] U.S. Cl. ....................................... 364/900; 101/93

[58] Field of Search .................... 101/93, 93 C, 93.19; 197/49; 340/172.5; 445/1

[56] References Cited

U.S. PATENT DOCUMENTS

| | | | |
|---|---|---|---|
| 2,051,112 | 8/1936 | Spaloss | 197/49 |
| 3,144,821 | 8/1964 | Drejza | 101/93 |
| 3,172,353 | 3/1965 | Helms | 101/93 |
| 3,507,213 | 4/1970 | Derc | 101/93 |
| 3,651,487 | 3/1972 | Washington | 340/172.5 |
| 3,712,212 | 1/1973 | Beery | 101/93 C |
| 3,834,306 | 9/1974 | Gilbert | 101/93 C |
| 3,858,509 | 1/1975 | Grunherr | 101/93.19 |
| 3,934,641 | 2/1976 | Fulton | 340/172.5 X |

*Primary Examiner*—Harvey E. Springborn
*Attorney, Agent, or Firm*—M. J. Colitz; T. J. Anderson; B. P. Smith

[57] ABSTRACT

A serial printer comprises a carriage, a print member rotatably mounted to the carriage and including a plurality of character elements of a predetermined font style, drive means coupled to the print member for rotating the print member to a desired rotational position in order to place a selected character element at a printing position adjacent a record medium to be printed upon, print hammer means mounted to the carriage and capable when enabled of impacting the character element located at such printing position with a desired level of force, and hammer control apparatus coupled to the print hammer means for enabling the print hammer means when the selected character element has been rotated to the desired rotational position. The hammer control apparatus comprises means responsive to a first signal representative of the selected character element to be impacted for generating a second signal proportional to a desired level of force with which the selected character element is to be impacted by the print hammer means when the plurality of character elements are defined in any one of at least two different font styles, one of which being the predetermined font style, means coupled to the means for generating a second signal for multiplying the second signal by a constant identified with the predetermined font style to form a third signal representative of the desired level of force with which the selected character element is to be impacted, means coupled to the print member for detecting when the selected character element has been rotated to the desired rotational position, and means responsive to such detection for coupling the third signal to the print hammer means thereby enabling the print hammer means to impact the selected character element with the desired level of force.

10 Claims, 29 Drawing Figures

HAMMER INTENSITY SELECTION APPARATUS FOR SERIAL PRINTER

CROSS-REFERENCE TO RELATED APPLICATIONS

The present invention as described in the subject application is related to the following U.S. applications:

1. U.S. application Ser. No. 633,331 filed on Nov. 15, 1975 in the name of Frank D. Ruble for VELOCITY COMMAND SIGNAL GENERATING APPARATUS and assigned to the assignee of the present invention;
2. U.S. application Ser. No. 682,877 filed concurrently herewith in the names of Frank D. Ruble, Louis H. Chang and John C. Fravel for CONTROL APPARATUS FOR SERIAL PRINTER and assigned to the assignee of the present invention;
3. U.S. application Ser. No. 682,950 filed concurrently herewith in the names of Louis H. Chang and John C. Fravel for POSITION RETRY APPARATUS FOR SERIAL PRINTER and assigned to the assignee of the present invention;
4. U.S. application Ser. No. 682,949 filed concurrently herewith in the name of Louis H. Chang for SIGNAL PRIORITY LOGIC FOR SERIAL PRINTER and assigned to the assignee of the present invention; and
5. U.S. application Ser. No. 682,881 filed concurrently herewith in the names of John C. Fravel, Louis H. Chang and Harunoira Yoshikawa for INCREMENT-DECREMENT LOGIC FOR SERIAL PRINTER and assigned to the assignee of the present invention.

BACKGROUND OF THE INVENTION

This invention relates to serial printers and, more particularly, to hammer control apparatus for impact serial printers.

Impact serial printers have taken many forms over the decades with the most common and widespread one being the typewriter. In recent years, the seemingly exponentially increasing use of computer-based high speed information processing systems has placed a strong demand on impact serial printers in terms of speed, performance and reliability. Prior art serial printers especially adapted to print computer-based output data have, in the past, relied upon hard-wired control logic to implement the many control functions and operations required. An example of one such printer is disclosed in U.S. application Ser. No. 505,105 filed in the name of Andrew Gabor on Sept. 11, 1974 for HIGH SPEED PRINTER WITH INTERMITTENT PRINT WHEEL AND CARRIAGE MOVEMENT and assigned to the assignee of the present invention.

In accordance with such prior art serial printers, it has been found advantageous to vary the level of impact force dependent upon the particular character element desired to be struck in order to obtain a substantially uniform print density among all character elements of a particular font style. One way this has been accomplished in the past in connection with a "daisy wheel" type of serial printer is disclosed in U.S. Pat. No. 3,858,509 issued on Jan. 7, 1975 and assigned to the assignee of the present invention. Generally speaking, an ASCII code is used to identify a desired character element to be struck and the desired level of force with which such character element is to be struck.

Oftentimes it is desirable to replace the particular print member being employed in order to change the font style of the character elements. It is also oftentimes desired to print multiple record media simultaneously, e.g. by using carbon paper or the like. In either event, i.e. using a different font style or printing multiple copies, it may be necessary to adjust the impact forces for all characters, i.e. the relative levels of force among the characters remain the same, but the overall force on each is decreased or increased, dependent upon the particular font style employed or number of copies desired to be printed. Such adjustment has, in the past, been effected by mechanical means with its inherent disadvantages, e.g. wear, short life cycle, etc.

It would be desirable, therefore, if the manner of adjusting hammer force levels dependent upon font style or the number of copies to be printed could be accomplished in a more reliable and efficient manner.

SUMMARY OF THE INVENTION

In accordance with one aspect of the present invention, a hammer control apparatus is provided for a serial printer of the type comprising a carriage, a print member rotatably mounted to the carriage and including a plurality of character elements of a predetermined font style, drive means coupled to said print member for rotating the print member to a desired rotational position in order to place a selected character element at a printing position adjacent a record medium to be printed upon, print hammer means mounted to the carriage and capable when enabled of impacting the character element located at the printing position with a desired level of force, and hammer control apparatus coupled to the print hammer means for enabling the print hammer means when the selected character element has been rotated to the desired rotational position.

The unique hammer control apparatus of the present invention comprises means responsive to a first signal representative of the selected character element to be impacted by the print hammer means when the plurality of character elements are defined in any one of at least two different font styles, one of which being the predetermined font style, means coupled to the means for generating a second signal for multiplying the second signal by a constant identifying the predetermined font style to form a third signal representative of the desired level of force with which the selected character element is to be impacted, means coupled to the print member for detecting when the selected character element has been rotated to the desired rotational position, and means responsive to such detection for coupling the third signal to the print hammer means thereby enabling the print hammer means to impact the selected character element with the desired level of force.

These and other aspects and advantages of the present invention will be more completely described below with reference to the accompanying drawings.

DESCRIPTION OF THE PREFERRED EMBODIMENT

Figure 1:
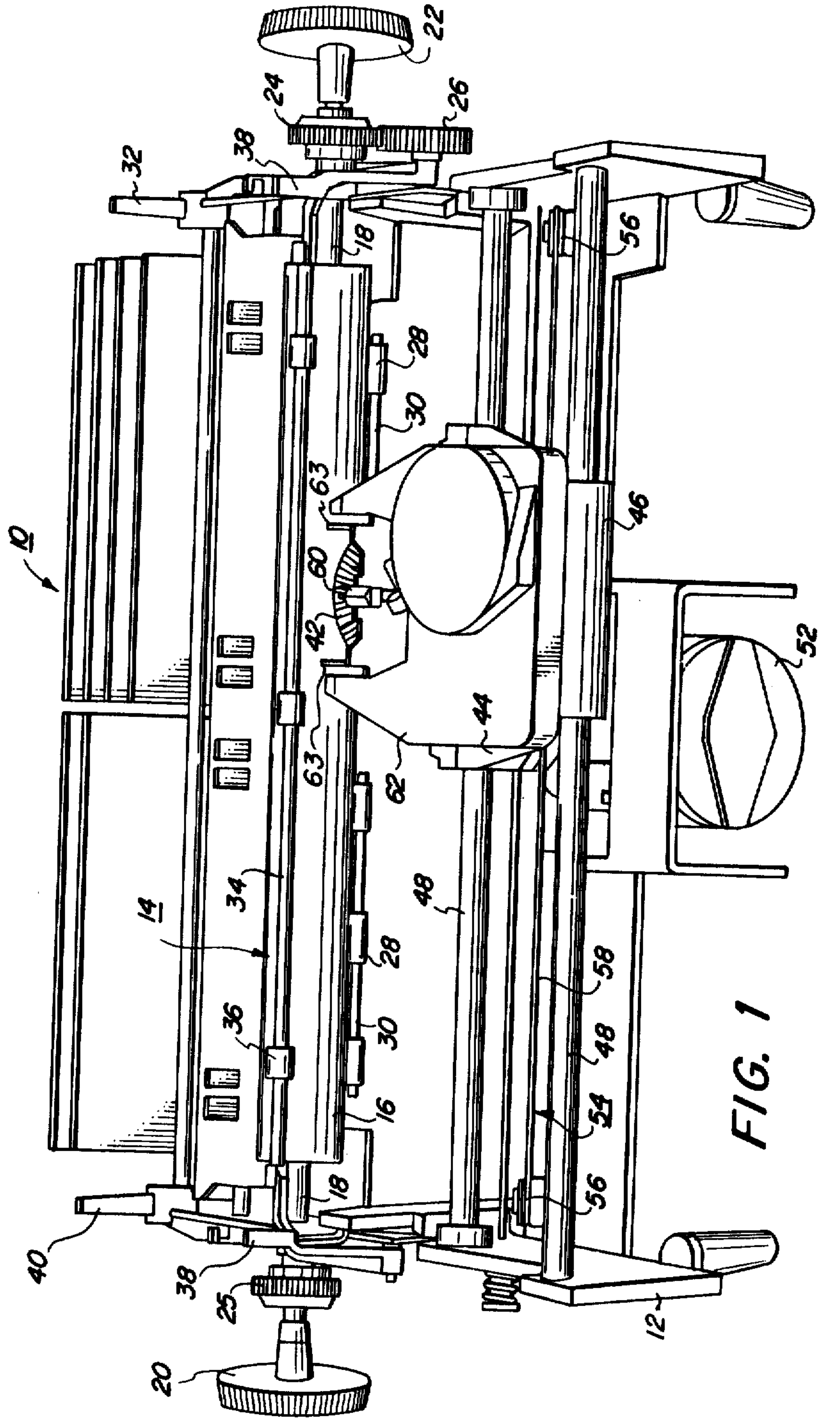
FIG. 1 is a front perspective view of a serial printer embodying the apparatus of the present invention therein.

Referring to FIG. 1, a serial printer 10 is shown including a unitary frame 12 to which a platen assembly 14 is mounted for rotation about its axis. More specifically, the platen assembly 14 includes a platen 16 mounted to a shaft 18 for rotation therewith. The shaft 18 is, in turn, rotatably mounted to the frame 12 and includes a pair of knobs 20 and 22 mounted at respective ends of the shaft for enabling manual controlled rotation of the shaft 18 and platen 16. As is conventional, the knob 20 is fixed to the shaft and the knob 20 is movable axially of the shaft between first and second positions. When in a first position, a gear-drive assembly 24 mounted about the shaft 18 adjacent the knob 22 is engaged with the shaft so that a motor-gear arrangement 26 (only partly shown) coupled to the gear-drive assembly 24 controls the automatic rotation of the shaft 18. When in a second position, the knob 22 disengages the gear-drive assembly 24 from the shaft so that manual rotation of the knobs 20 and 22 will cause a corresponding rotation of the shaft 18 and platen 16.

The platen assembly 14 also comprises a plurality of pressure rollers 28 connected to one or more lower bail bars 30. By way of example, four bail bars 30 are employed (only the front two visible in FIG. 1), each bail bar having three rollers 28 rotatably mounted thereon. As is conventional in serial printers and typewriters, a spring-biased lever 32 is included in the printer 10 for manual movement between a first or rearward position and a second or forward position. Conventional linkage means (not shown) is provided for maintaining the rollers 28 in pressure engagement with the platen when the lever 32 is at its first position and for retracting and holding the rollers 28 a predetermined distance from the platen 16 when the lever is moved to its second position. With the rollers 28 in pressure engagement with the platen 16, a record material (not shown) may be positively fed through the printer 10 along the platen and past a printing position (to be defined below) as the platen is rotated either manually or automatically.

The platen assembly 14 further includes an upper bail bar 34 having a plurality, e.g. three, follower rollers 36 rotatably mounted thereon. These rollers, when engaged with the platen 16, serve to hold the record material on the platen so that it is directed from the printer 10 in a generally rearward direction, as is conventional.

Conventional spring-biased levers 38 are connected to the printer 10 and to the bail bar 34 for maintaining the rollers 36 in pressure engagement with the platen 16 when the levers 38 are in a first or rearward position, and for removing and holding the bail bar 34 and thus rollers 36 a predetermined distance forwardly of the platen 16 when the levers 38 are moved to second or forward position.

In order to accomodate record material of different thicknesses, the platen assembly 14 also preferably includes a lever 40 connected to the printer 10 and capable of being manually positioned at a number of detent positions corresponding to desired distances of the platen 16 from a print member 42 mounted adjacent the platen and to be described in more detail below. Appropriate and conventional linkage and mounted means (not shown) coupled between the lever 40 and the platen 16 achieves the desired shifting of the platen in response to movement of the lever 40.

The platen assembly 14 as thus described is entirely conventional and further details thereof may be obtained, by way of example, through a review of the HyType I or HyType II serial printers manufactured by Diablo Systems, Inc. of Hayward, California.

Still referring to FIG. 1, the printer 10 also includes a carriage assembly 44 mounted by a pair of bearing members 46 (only one shown) to a respective pair of rods 48 which are themselves mounted at each end to the frame 12 of the printer 10. Details of an exemplary carriage assembly are disclosed in co-pending U.S. application Ser. No. 664,789 filed on Mar. 8, 1976 in the names of Mario G. Plaza and Richard D. Trezise for PRINT MEMBER CARRIAGE ASSEMBLY and assigned to the assignee of the present invention.

A drive motor 52 is coupled by a suitable cable-pulley arrangement 54 to the carriage assembly 44. As is conventional, the cable-pulley arrangement includes a first pulley (not shown) connected to the shaft of the drive motor 52, a plurality (e.g., 2 or 4) second pulleys 56 coupled to opposing sides of the frame 12 and a third pulley (not shown) connected to the carriage assembly 44. At least one cable 58 is wrapped around the pulleys for imparting linear motion to the carriage assembly 44 along the rails 48 in response to rotation of the motor-drive shaft. For more details of the specific cable-pulley arrangement shown in the drawings, reference may be had to the aforementioned HyType II serial printer. For an alternative approach, reference may be had to U.S. Pat. No. 3,872,960.

The carriage assembly 44 generally includes and is adapted to transport a rotatable print member 42, which may be a daisy wheel type of print wheel and which is mounted for rotation about its axis, a drive motor (not shown) kinematically coupled to the print wheel for controlling the direction and speed of rotation of the print wheel 42, a hammer assembly 60 for impacting an aligned character element on the print wheel against the adjacent support platen 16, a ribbon cartridge 62 for supplying inked ribbon (not shown) between the hammer assembly 60 and platen 16, a ribbon cartridge motor (not shown) for transporting ribbon in front of the hammer assembly along a pair of guides 63 during operation of the printer, and a ribbon lift mechanism 64 (FIG. 2) for selectively lifting the ribbon in order to print in a second of two colors when the ribbon is of a type having dual-colored portions.

The specific nature of the hammer assembly 60 and ribbon cartridge 62 form no part of the present invention and thus will not be described in detail herein. However, details of an exemplary hammer assembly are disclosed in co-pending U.S. application Ser. No. 664,797 filed on Mar. 8, 1976 in the names of Mario G. Plaza and Michael C. Weisberg for HAMMER ASSEMBLY and assigned to the assignee of the present invention, and details of an exemplary ribbon cartridge are disclosed in co-pending U.S. application Ser. No. 633,530 filed on Nov. 19, 1975 in the names of Mario G. Plaza and Richard D. Trezise for DUAL LEVEL RIBBON CARTRIDGE and assigned to the assignee of the present invention.

As will be described in greater detail below, the hammer assembly 60 will be actuated to print a selected character element on the wheel 42 after the print wheel has been rotated, if necessary, to bring the selected character element to a stopped position in alignment with the hammer assembly 60. Additionally, hammer impacting will not take place until the carriage is at or has been brought to a stopped position corresponding to the desired linear position for the selected character element to be imprinted. Once the character has been imprinted, the print wheel 42 is controlled to bring a newly selected character element for printing in alignment with the hammer assembly, the carriage is moved to a newly desired linear position along the rods 48 adjacent the platen, the ribbon in the cartridge 62 is advanced a predetermined increment and the record material on the platen is moved, if desired, in an appropriate vertical direction.

Figure 2A:
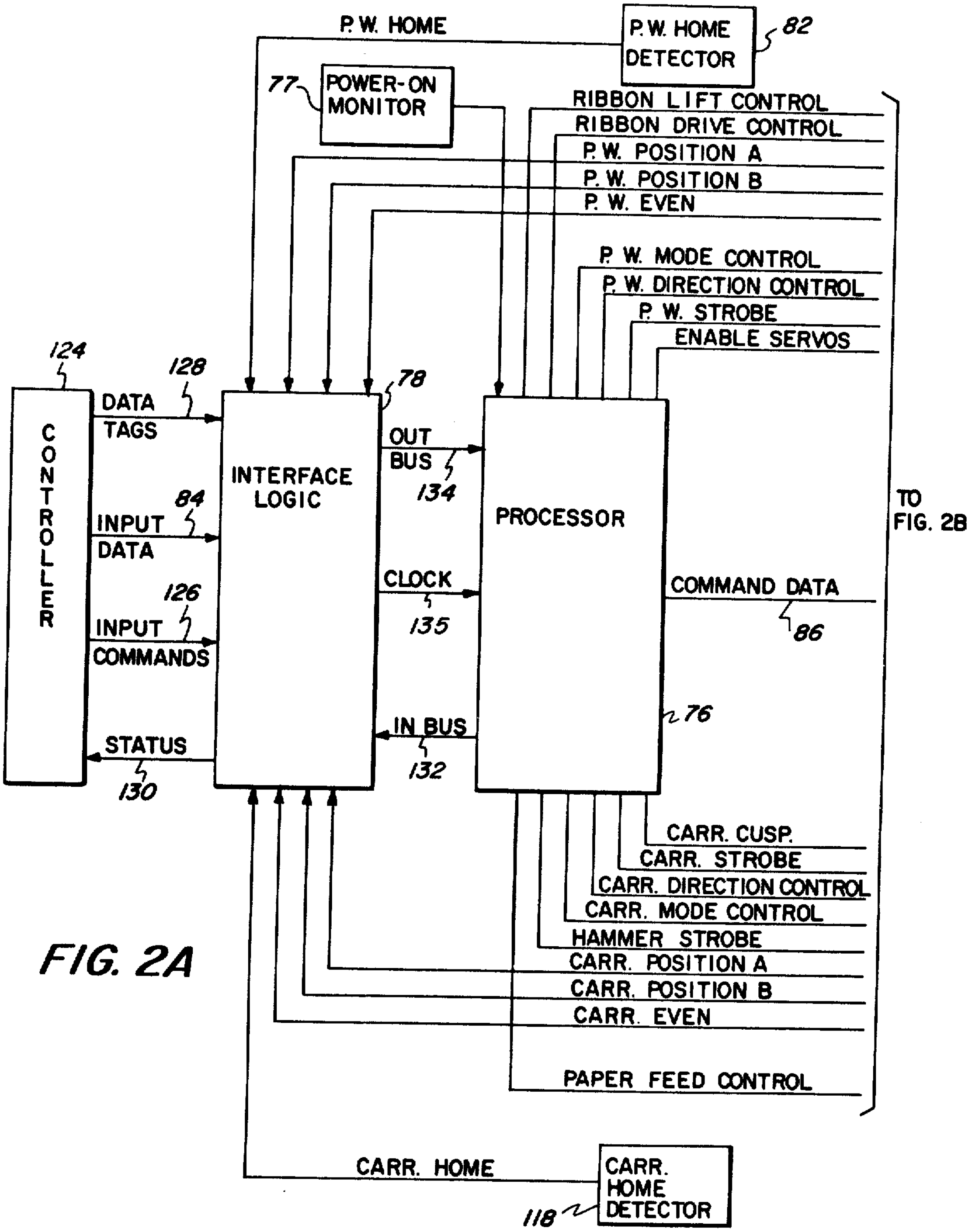
FIG. 2 is a schematic block diagram of the printer of FIG. 1.
Figure 2B:
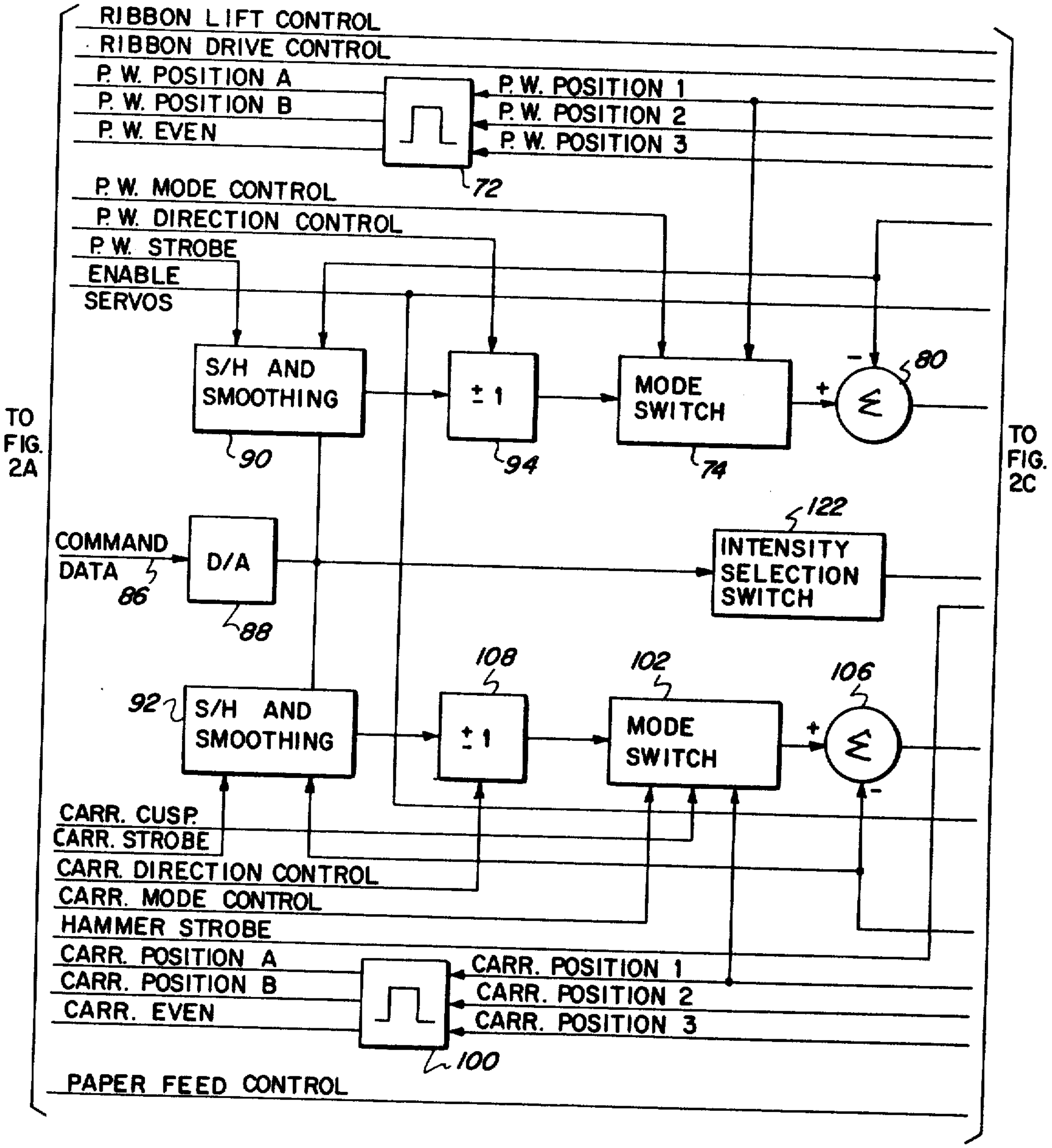
Figure 2C:
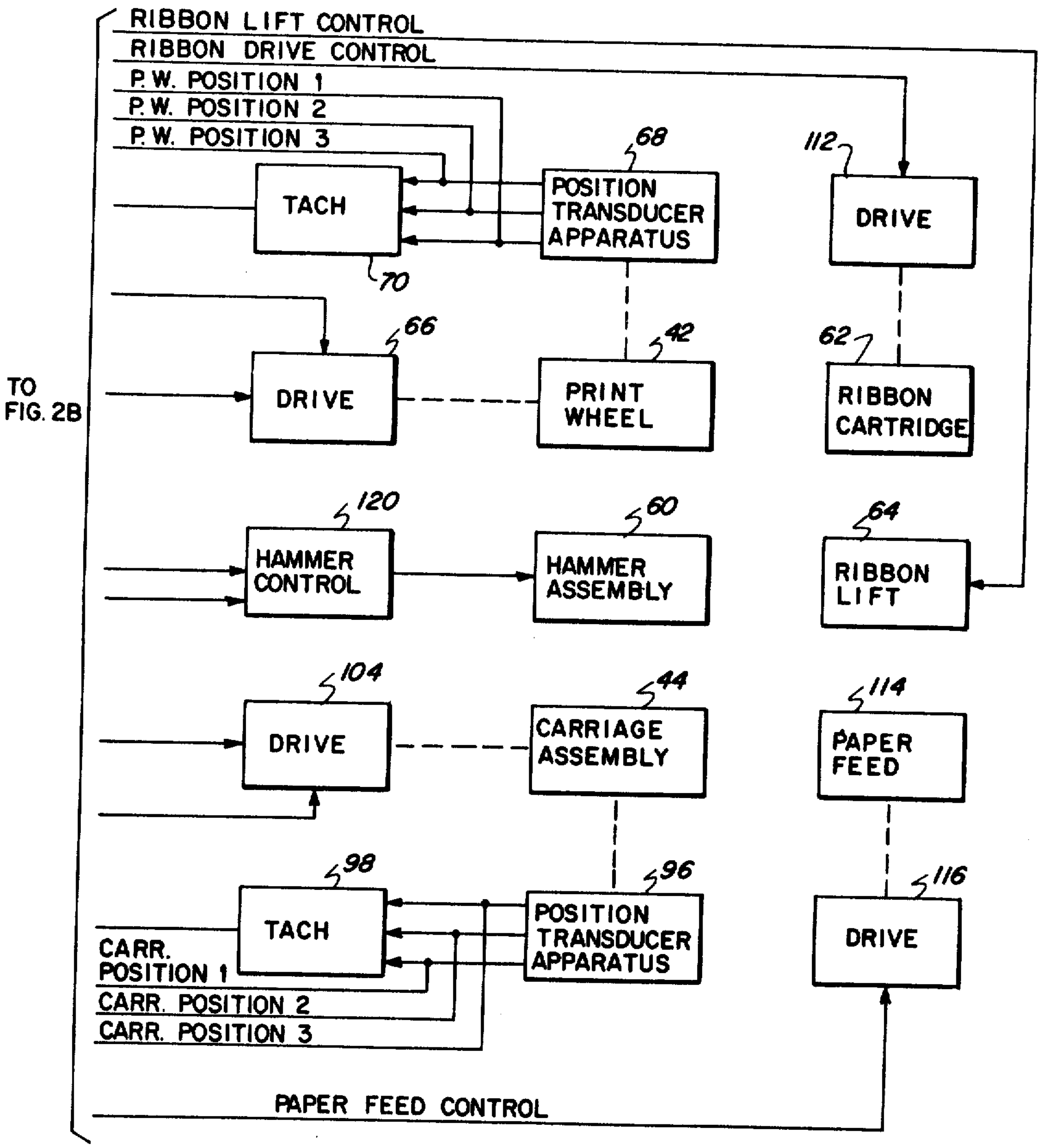

Reference is now had to FIG. 2 for a general description of the manner by which the rotation of the print wheel 42, linear movement of the carriage assembly 44, actuation of the hammer assembly 60, advancing of ribbon in the ribbon cartridge, actuation of the ribbon lift mechanism 64, and rotation of the platen 16 or advancing of an auxiliary tractor feeder (not shown) for feeding record material, such as paper, loaded in the printer 10 about the platen, are accomplished.

Referring first to the print wheel 42, the direction and speed of rotation of the wheel is controlled by the print wheel drive circuits and motor included diagramatically in the block 66 and hereinafter referred to collectively as the "print wheel drive" 66. The print wheel drive is controlled by a print wheel servo control system which is desirably of the "dual-mode" type. Thus, and as shown in FIG. 2, a position transducer apparatus 68 is kinematically coupled to the print wheel 42 by suitable means (not shown) and functions to generate a plurality of position signals, e.g. three position signals — P.W. POSITION 1, P.W. POSITION 2 and P.W. POSITION 3. These three signals are periodic in nature during rotation of the print wheel 42 and have substantially the identical frequency and peak amplitude wherein P.W. POSITION 1 and P.W. POSITION 2 are desirably 180° out of phase and P.W. POSITION 3 is desirably 90° out-of-phase with each of the P.W. POSITION 1 and P.W. POSITION 2 signals. Each period of any one or more of the position signals can be detected to sense rotation movement of the print wheel 42 a predetermined incremental distance. The precise manner by which this is accomplished in accordance with the preferred embodiment will be described in more detail below in connection with FIGS. 3 and 7.

Any suitable position transducer apparatus 68 capable of generating the type of position signals discussed above can be employed in accordance with the present invention. An exemplary position transducer apparatus is disclosed in co-pending U.S. application Ser. No. 670,465 filed on Mar. 25, 1976 in the name of Kenneth C. Cocksedge for IMPROVED PHASE SENSITIVE TRANSDUCER APPARATUS and assigned to the assignee of the present invention. As disclosed in that application, the position transducer apparatus may include an inductive transducer having a fixed stator with a pair of windings and a rotatable rotor having a single winding, the rotor being connected to the print wheel for rotation therewith. A pair of 90° phase-displaced sinusoidal signals of substantially identical frequency and peak amplitude are respectively applied to the two stator windings and a constant amplitude signal is developed on the rotor winding which, during relative rotation of the stator and rotor, is phase-modulated. Output circuitry is coupled to the rotor winding for deriving four positions signals, each of which is triangular in configuration during rotation of the rotor and thus print wheel wherein a first pair of the position signals are 90° phase-displaced and the other pair of position signals represent the complements of the first pair. The three position signals for use in the present invention can be selected from the four developed by the phase-sensitive transducer apparatus disclosed in the aforesaid U.S. application Ser. No. 670,465.

Details of a presently preferred position transducer apparatus may be obtained through a review of the preliminary maintainence manual for the aforementioned HyType II serial printer manufactured by Diablo Systems, Inc. of Hayward, California, such manual being included as Appendix A to this application.

The three position signals, i.e. P.W. POSITION 1 P.W. POSITION 2 and P.W. POSITION 3, are applied along respective lines from the position transducer apparatus 68 to respective inputs of a tachometer 70 and to respective inputs of a wave-shaping circuit 72. Additionally, the P.W. POSITION 1 signal is applied to one input of a mode switch 74 for a purpose to be described below. The tachometer 70 may be of any suitable variety capable of responding to the three position signals for deriving an output signal, i.e. P.W. ACTUAL VELOCITY, representative of the actual velocity of rotation of the print wheel 42. As these types of tachometers are entirely well known in the art, the specific nature of tachometer 70 will not be described in detail herein. Such details, however, if desired, may be obtained through a review of Appendix A hereto. The P.W. ACTUAL VELOCITY signal is applied from the tachometer 70 to one input of a summing network 80, the output of which is coupled to the print wheel drive 66 for controlling same in a manner to be described below.

As indicated above, the three position signals from the position transducer apparatus 68 are also applied to respective inputs of the wave-shaping circuit 72. As will be recalled, the position signals P.W. POSITION 1, P.W. POSITION 2 and P.W. POSITION 3 are desirably triangular waveforms during rotation of the print wheel 42. As will be described in more detail below, these signals, along with other signals, are monitored and processed by a data processor 76, desirably of the programmed microprocessor type, for controlling the operations of all controllable elements in the printer 10. In order for the three position signals to be in a format utilizable by the processor 76, they must be "digitized," or shaped into "square-wave" signals. As used herein, the term square-wave shall be deemed to include both square and rectangular waveforms. Consequently, the wave-shaping circuit 72 converts the triangular waveform position signals P.W. POSITION 1, P.W. POSITION 2 and P.W. POSITION 3 into three corresponding square-wave position signals P.W. POSITION A, P.W. POSITION B and P.W. EVEN, wherein the first two signals are desirably 90° out-of-phase instead of 180°, and the latter signal is desirably about 45° phase-displaced with both the P.W. POSITION A and P.W. POSITION B signals, instead of 90° phase-displaced. A presently preferred wave-shaping circuit for use as circuit 72 is disclosed in Appendix A hereto.

The P.W. POSITION A, P.W. POSITION B and P.W. EVEN signals are coupled from the wave shaping circuit 72 along respective lines to respective inputs of an interface logic circuit 78. As will be described in more detail below, the interface logic 78 includes means responsive to these three position signals for detecting the direction of rotation of the print wheel 42 and for applying an appropriate increment or decrement signal to the processor 76 for reasons also to be described in more detail below.

In accordance with dual-mode servo operation, the print wheel servo system controls rotation of the print wheel 42 in a first or velocity mode until the print wheel reaches a predetermined position or "homing region" relative to its desired rotational stopping position. This homing region may, for example, be defined when the print wheel is within one character element space of its desired stopping position. When the homing region is reached, the servo system switches to a second or position mode of operation. In the velocity mode of operation, the P.W. ACTUAL VELOCITY signal developed at the output of tachometer 70 is compared at summing network 80 with a P.W. COMMAND VELOCITY signal generated in a manner to be described below as applied through the mode switch 74 to a second input of the summing network 80. The resultant comparison signal at the output of the summing network 80 controls the print wheel drive 66. In the position mode of operation, the P.W. ACTUAL VELOCITY signal is compared at summing network 80 with the P.W. POSITION 1 signal as applied to the second input of the summing network 80 through the mode switch 74 with the resultant comparison signal controlling the print wheel drive 66. The state of a P.W. MODE CONTROL signal applied from the processor 76 to the mode switch 74 determines which signal, i.e. P.W. COMMAND VELOCITY or P.W. POSITION 1, is applied to the second input of the summing network 80 for comparison with P.W. ACTUAL VELOCITY signal. The processor 76 changes the state of P.W. MODE CONTROL when the print wheel 42 has been rotated to the homing region in order to change servo control from the velocity to the position mode of operation.

The manner in which the P.W. COMMAND VELOCITY signal is generated and the state of the P.W. MODE CONTROL signal changed will now be described in general terms, a more specific description to follow later. Generally speaking, therefore, the print wheel 42 contains a plurality of character elements supported on radially extending spokes. Each character element is assigned a unique 7-bit code. The print wheel has an initialization or "home" position at which a predesignated character element is located in alignment with the hammer assembly 60. When appropriate power is applied to the printer 10 as detected by a power-on monitor circuit 77, the print wheel is "initialized" or rotated to its home position. The carriage assembly 44 is also initialized during this time to move it to a predetermined linear or home position, as will be discussed in more detail below.

The interface logic 78 includes means responsive to the P.W. POSITION A, P.W. POSITION B and P.W. EVEN signals for generating two counting pulses each time the print wheel is rotated one character element space in either direction. These counting pulses are applied by the interface logic 78 to the processor 76 where an actual position software counter thereof accepts the pulse and either increments or decrements the count stored therein, as indicative of the actual rotational position of the print wheel 42, depending upon the direction of rotation of the print wheel, it being noted at this point that the processor 76 is capable of rotating the print wheel 42 through the shortest arc to the desired stopping position.

The print wheel 42 includes a detection mark or indicia thereon which can be detected by a print wheel home detector 82 during rotation of the print wheel. In response to such detection, a P.W. HOME signal is generated by the detector 82 and is applied to the interface logic 78. During initialization of the print wheel 42, the print wheel is commanded to rotate in a clockwise direction up to a velocity corresponding to the movement of a predetermined number of character element spaces, e.g. 15 character element spaces or 30 counting pulses. The print wheel is then continuously rotated clockwise at this velocity until the print wheel home detector detects the home mark on the wheel a predetermined number of times, e.g. three times. When the third P.W. HOME signal is generated, the actual position software counter in the processor 76 is reset to zero and, assuming the print wheel is "oriented" in a manner to be described below, the print wheel is commanded to stop and does stop 30 increment counting pulses later, i.e. the counter registered in the counter is 30. This count corresponds to the home position of the print wheel 42 wherein a predetermined character element is aligned with the hammer assembly 60.

Following print wheel and carriage initialization, if a character element is selected for printing, the unique code for that character element is delivered along an input data bus 84 from a suitable host controller 124 to the interface logic 78 where it is then applied along an OUT bus 134 to the processor 76. The processor 76, in the manner to be described in more detail below, converts the 7-bit code for the selected character element into a digital binary count representative of the spoke position of the character element relative to the szero count established in response to the third P.W. HOME signal detection upon initialization. This new desired position count is stored in another software counter in the processor 76. The processor 76 is programed during each internal cycle thereof to compute the difference between the actual position of the print wheel, as indicated by the count stored in the actual position software counter, with the desired position as indicated by the digital binary count stored in the desired position software counter. The processor also computes the shortest direction of travel for the print wheel and generates a P.W. DIRECTION CONTROL signal indicative of such computation, such signal being utilized in a manner to be described below.

The processor 76 includes means responsive to the periodically calculated difference between the actual and desired position counts of the print wheel for causing a normalized P.W.. COMMAND VELOCITY signal to be generated on a command data bus 86. This signal, which is in digital binary form, is proportional to an optimal velocity of movement of the print wheel 42 for the particular distance remaining to be traveled. This signal is fed through a conventional D/A converter 88 where it is converted to an analog signal. The analog signal is then forwarded to a pair of sample-and-hold and smoothing circuits 90 and 92, but will be gated only into the circuit 90 in response to a P.W. STROBE signal generated by the processor 76, which signal enables the circuit 90 to receive the analog normalized P.W. COMMAND VELOCITY from the D/A converter 88. The circuit 90 includes means for multiplying the normalized P.W. COMMAND VELOCITY signal by a constant representative of the motion characteristic of the print wheel 42. The P.W. COMMAND VELOCITY signal at the output of the circuit 90 is then coupled through a conventional $\pm 1$ circuit 94 where it is selectively inverted depending upon the state of the P.W. DIRECTION CONTROL signal. The P.W. COMMAND VELOCITY signal at the output of the $\pm 1$ circuit 94 is coupled to the second input of the mode switch 74 where it will be gated through to the summing network 80 when the servo system is in the velocity mode of operation and will be prevented from being fed to the summing network 80 when the servo system is in the position mode of operation. For further details of exemplary sample-and-hold and smoothing circuits, reference may be had to the previously mentioned U.S. application Ser. No. 633,331 and to Appendix A hereto.

Referring now to the carriage assembly 44, it too is controlled by a dual-mode servo system substantially identical to that for the print wheel 42. Thus, the carriage servo system includes a position transducer apparatus 96 kinematically coupled to the carriage assembly 44 and capable of generating three position signals, i.e. CARR. POSITION 1, CARR. POSITION 2 and CARR. POSITION 3. As with the position transducer apparatus 68, these three carriage position signals are periodic in nature during linear movement of the carriage and each having substantially the identical frequency and peak amplitude. Desirably, the three signals have triangular waveforms during linear movement of the carriage. As in the print wheel servo system, the three above-identified carriage position signals are applied to respective inputs of a tachometer 98 substantially identical to tachometer 70 and to respective inputs of a wave-shaping circuit 100 substantially identical to the circuit 72. Additionally, the CARR. POSITION 1 signal is applied to one input of a mode switch 102 substantially identical to the switch 74.

Linear movement of the carriage assembly 44 is directly controlled by a carriage drive 104 which includes the carriage drive motor 52 (FIG. 1) and associated drive circuits (not shown). The carriage drive 104 is, in turn, controlled by the output of a summing network 106 substantially identical to summing network 80. The summing network has one input coupled to the output of the tachometer 98 in order to receive a CARR. ACTUAL VELOCITY signal generated thereby. A second input of the summing network 106 is adapted to receive the output signal from the mode switch 102 which is either a CARR. COMMAND VELOCITy signal during the first or velocity mode of operation and the CARR. POSITION 1 signal during the second or position mode of operation. The output of the summing network 106 is representative of a comparison of the CARR. ACTUAL VELOCITY signal with the output signal from the mode switch 102. As with the mode switch 74, the mode-switch is controlled in accordance with a CARR. MODE CONTROL signal forward to a control terminal of the switch 102 by the processor 76.

More specifically, the interface logic 78 receives on the input data bus 84 a digital binary word containing information representative of the distance to be traveled by the carriage assembly until a desired linear position for the carriage assembly to be moved to is reached, as well as information as to the direction of travel of the carriage assembly. When the portion of the input data relating to the distance to be traveled is received by the processor 76, it is stored in a difference software counter. Then, every time the carriage is moved one predetermined increment of linear travel, e.g. 1/120 of an inch, as detected by the shaped carriage position signals, i.e. CARR. POSITION A, CARR. POSITION B and CARR. EVEN, fed back to the processor 76 through the interface logic 78, the difference software counter is decremented by one. Detection of such incremental movement can be accomplished, by way of example, by detecting evey zero crossing of a predetermined one of the three carriage position signals in accordance with known techniques. A preferred circuit for detecting such incremental movement and generating corresponding decrement counting pulses will be described below in connection with FIG. 7.

When the carriage has been moved to a predetermined position, or homing region, relative to the desired stopping position, e.g. within one increment or counting pulse away, the processor raises the CARR. MODE CONTROL signal in order to prevent the CARR. COMMAND VELOCITY signal from being gated through the switch 102 and instead gating through the CARR. POSITION 1 signal.

The CARR. COMMAND VELOCITY signal, in a manner similar to the generation of the P.W. COMMAND VELOCITY SIGNAL, is developed at the output of the sample and hold-smoothing circuit 92 before being forwarded to the mode switch 102. More specifically, the processor's software counter keeping track of difference remaining data, i.e. the difference count, is sampled once each internal processing cycle of the processor 76. The processor also includes means, to be described in detail below, responsive to the sampled difference count for generating a corresponding time optimal command velocity on the command data bus 86. This signal is normalized as described above in connection with the normalized P.W. COMMAND VELOCITY signal. The signal on bus 86 is converted to analog form by the D/A converter 88 and then applied to both circuits 90 and 92. Only circuit 92 is enabled, however, by the processor 76 which raises a CARR. STROBE signal that is applied to an enable input of the circuit 92. The circuit 92 multiplies the analog normalized CARR. COMMAND VELOCITy input by a constant representative of the motion characteristics of the carriage assembly 44. Again, further details of circuit 92 can be obtained through a review of the aforementioned U.S. application Ser. No. 633,331 and Appendix A hereto.

Unlike the print wheel control, the difference remaining data for carriage assembly positioning is not computed by the processor 76, but rather is received initially from a host controller 124 which keeps track of the actual position of the carriage. Further, the host controller supplies information as to the direction of movement which is received by the processor 76 and used in the generation of an appropriate CARR. DIRECTION CONTROL signal for application to the ±1 circuit 108.

When power is first turned on, the carriage assembly 44 is initialized or moved to a predetermined reference position. As will be described in more detail below, during initialization, the carriage assembly is commanded to move toward the left (FIG. 1) until a carriage home detector 118 mounted at a predetermined reference position detects the leading edge of the carriage assembly 44. Upon such detection, a CARR. HOME signal is generated by the detector 118 and applied to the processor 76 through the interface logic 78. The drive is then disabled and, after a predetermined time interval, i.e. 0.1 second, the carriage assembly 44 is commanded to move to the right two increments after the HOME signal goes LO. The carriage assembly is then stopped. This is the carriage home position. As with the print wheel, the position counts are derived from the CARR. POSITION A, CARR. POSITION B AND CARR. EVEN signals applied to the processor 76 through the interface logic 78. Unlike the print wheel control, however, there is only one carriage position count generated for each predetermined increment of travel i.e. 1/120th of an inch, the counts being generated upon detection of every zero-crossing of a predetermined one of the three carriage position signals just mentioned. As will be described in more detail below, the position counts generated after initialization are used to decrement the difference count stored in the difference software counter alluded to above.

It will be realized that the description of the control apparatus relating to print wheel rotation and carriage assembly linear movement has been very generalized to this point in order to acquaint the reader with the manner and operation of the dual-mode servo system for the print wheel 42 and carriage assembly 44. The specific nature of the interface logic 78 and processor 76 and the manner by which it controls operation of not only the print wheel 42 and carriage assembly 44, but also all other controllable elements of the printer 10 will be described in more detail below.

Before commencing such description, it will be noted that such other controllable elements include the ribbon cartridge 62, wherein the advancing of ribbon is controlled by a ribbon cartridge drive 112 which includes the ribbon cartridge drive motor and associated drive circuits (both not shown). The ribbon cartridge drive 112 is, in turn, controlled by the state of a RIBBON DRIVE CONTROL signal applied to the drive 112 from the processor 76. The RIBBON DRIVE CONTROL signal is raised for a predetermined time interval after a character element is impacted by the hammer assembly 60 in order to step the ribbon a predetermined amount.

Another controllable element is the ribbon lift mechanism 64 which is selectively enabled by a RIBBON LIFT CONTROL signal from the processor 76 when it is desired to print in a different colored ink, assuming the ribbon to be multi-colored, or when it is desired to lower the ribbon for visibility of the printed data. Yet another controllable element is the paper feed assembly 114 which includes the gear-drive assembly 24 and the platen assembly 14 (FIG. 1). The paper feed assembly 114 is operated by a paper feed drive 116 which includes the motor-gear arrangement 26 (FIG. 1) and associated motor drive circuits (not shown). The paper feed drive 116 is, in turn, controlled by the state of a PAPER FEED CONTROL signal from the processor 76. This signal controls the stepping of the paper feed drive and the direction of rotation of the platen.

The final controllable element is the hammer assembly 60 which is actuated to impact the aligned character element of the print wheel 42 against the adjacent platen 16 only after both the print wheel and carriage assembly are at or have been brought to their desired stopping positions. The aligned character element selected for printing is impacted with a desired level of force for such particular character element and font style. Such desired level of force is defined by the level of a HAMMER ENERGY command signal applied to a first input of a hammer control circuit 120 and gated into such circuit when enabled by a HAMMER STROBE signal applied to a second input thereof from the processor 76.

As will be described in more detail below, the processor 76 includes means responsive to the 7-bit code defining the selected character element to be printed for generating a normalized HAMMER ENERGY signal proportional to a desired level of force with which the selected character element is to be struck when the character elements of the print wheel 42 are defined in any one of a plurality of different font styles, one of which being the particular font style of the print wheel being employed. This normalized HAMMER ENERGY signal is then applied from such converter to an intensity selection switching circuit 122. The circuit 122 includes means for multiplying the hammer energy signal by a constant identified with the particular font style being employed to form the HAMMER ENERGY command signal that is applied to the hammer control circuit 120.

The normalized HAMMER ENERGY signals generated by the processor 76 have a predetermined number of different relative levels dependent upon the particular character element. More specifically, a character element having a relatively small surface area, e.g. a period, should be impacted with a level of force much less than that for impacting a character element having a relatively large surface area, e.g. capital W. The normalized hammer energy levels may be expressed in terms of the relative voltage levels as $K_0x_1$, $K_0x_2$, . . . , $K_0x_n$, or simply $x_1$, $x_2$, . . . , $x_n$, where $x_1$ is the lowest normalized hammer energy level and $x_n$ the highest. These energy levels are each normalized in the sense of being proportional to a desired level of impact force for each of a predetermined number of character elements regardless of the particular font style employed. The purpose of the circuit 122 is to "calibrate" the normalized HAMMER ENERGY signals for the particular font style being employed by multiplying every normalized HAMMER ENERGY signal applied thereto by a constant identified with such particular font style. For examle, for pica, the HAMMER ENERGY command signals may be expressed as $K_1x_1$, $K_1x_2$ . . . , $K_1x_n$, whereas for elite, they may be expressed as $K_2x_1$, $K_2x_2$, . . . , $K_2x_n$, and so on. The circuit 122 may also be used to calibrate the normalized HAMMER ENERGY signals dependent upon the number of record media to be printed upon, as by carbon paper or the like.

Figure 10:
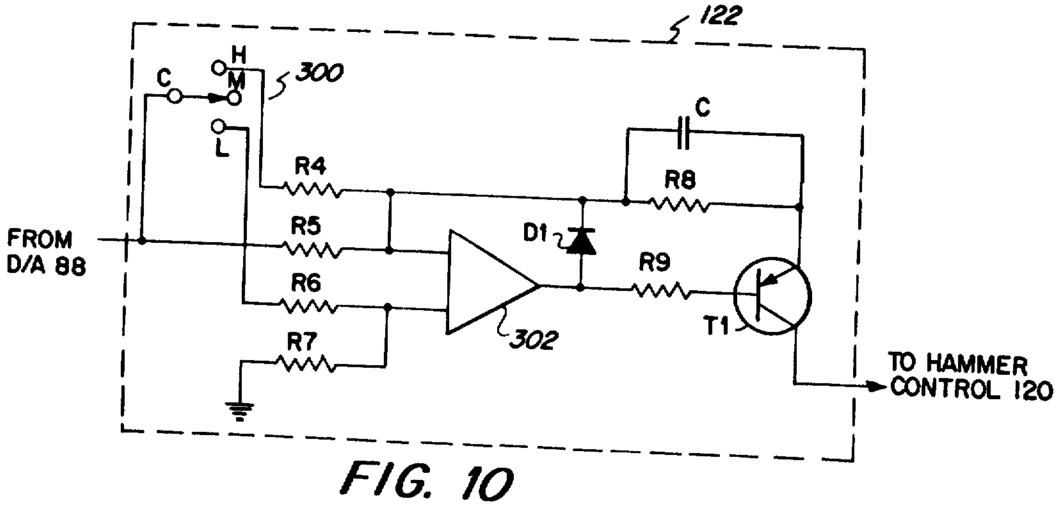
FIG. 10 is a schematic circuit diagram of the hammer intensity selection switch depicted in FIG. 2.

A presently preferred switching circuit 122 is depicted in FIG. 10. As shown, it includes a manual switch 300 which is preferably mounted to the frame 12 of the printer 10 for access by the operator of the printer. The switch desirably has a plurality of selectable contacts, e.g. three, appropriately marked high (H) medium (M) and low (L), which can be selectively manually coupled to a common contact, C of the switch 300. Each of these three settings identifies a particular one or more font styles and causes a different resistance to be included in circuit in order to effectively multiply the normalized HAMMER ENERGY signal from the D/A converter 88 by a constant representative of such particular one or more font styles.

Referring now specifically to the preferred circuit 122, it also includes an operational amplifier 302 having a first input coupled to the output of the D/A converter 88 and to the C contact of switch 300 through a first resistor R5, and also coupled to the H contact of switch 300 through a second resistor R4. A second input of the operational amplifier 302 is coupled to the L contact of switch 300 through a third resistor R6 and to ground through a fourth resistor R7. The output of the amplifier 302 is coupled to the base electrode of a transistor T1 through a resistor R9. Diode D1 provides circuit protection against reverse breakdown of the base-emitter electrodes of transistor T1. The emitter electrode of the transistor T1 is fedback through an RC circuit, comprised of a capacitor C and resistor R8 in parallel, to the first input of the operational amplifier 302. The HAMMER ENERGY command signal applied to the hammer control circuit 120 is developed at the collector electrode of transistor T1.

In operation, when the switch 300 is set at the M contact, the constant by which the normalized HAMMER ENERGY signal is multiplied with is determined mainly by the value of resistor R5. When the switch 300 is set at the H contact, the constant is determined mainly by the value of resistors R4 and R5. Lastly, when the switch 300 is set at the L contact, the constant is determined mainly by the value of resistors R5, R6 and R7. Referred values for the various components of FIG. 10 are as shown in the table below.

TABLE OF VALUES

| | | | |
|---|---|---|---|
| R4 | 30.1K | R8 | 1.0K |
| R5 | 8.45K | R9 | 100 |
| R6 | 26.1K | C | 560pF |
| R7 | 4.12K | | |

Referring again to FIG. 2, the control apparatus of the printer 10 will now be described in greater detail. To begin with, the printer 10 is designed to receive a number of input signals from the host controller 124 and to supply a number of output signals to such controller. These input and output signals are listed below.

INPUT SIGNALS

1. SELECT PRINTER — This signal is applied along an input command bus 126 from the controller 124. The purpose of this signal, when present, is to interrogate the printer for its status by enabling its READY outputs (to be discussed below). This signal also enables all other interface lines.

2. INPUT DATA — Twelve data lines comprising the input data bus 84 respectively receive a 12-bit data signal from the controller 124 containing movement commands for the several printer operations. When representing a coded character command, i.e. desired character element to be struck, the seven low order data bits are used. An exemplaray 7-bit modified ASCII code for the print wheel 42 is disclosed in Appendix A hereto. Bit 8, hereinafter called the "option bit," enables bits 9 through 12. When enabled, bits 9–11 are used to control print hammer energy and result in the generation of the normalized HAMMER ENERGY signal from the processor 76, as described above. The 12th bit controls the ribbon advance and is thus used by the processor 76 in the generation of the RIBBON DRIVE CONTROL signal also discussed above.

When representing a carriage assembly movement command, the ten low order bits of the 12-bit data signal represent carriage movement distances in multiples of 1/60th of an inch, and the 11th bit indicates direction of travel. The highest or 12th order bit selectively commands the carriage assembly to move at 1/120th of an inch, i.e. it adds 1/120th of an inch to the distance represented by the 10 low order bits.

3. DATA TAGS — Four data tag lines constituting a data tag bus 128 receive DATA TAG signals from the controller 124 which characterize the nature of input data being received on the input data bus 84 and which are used to initiate activities within the printer 10. The four DATA TAG signals are P.W. DATA TAG, CARR. DATA TAG, P.F. DATA TAG and OPTION DATA TAG, whre "P.F." stands for "paper feed." The option bit alluded to above and the OPTION DATA TAG can be used with such options as a split platen feeding device.

4. RESTORE — This signal is applied to the printer 10 from the controller 124 along an appropriate line in the input command bus 126. As will be described in more detail below, the presence of this signal causes the processor 76 to perform a restore sequence wherein the print wheel 42 and carriage assembly 44 are initialized, as alluded to above, and the printer control logic is reset.

5. RIBBON LIFT — This signal is also applied to the printer 10 from the controller 124 along an appropriate line in the input command bus 126 and is used by the processor 76 in the generation of the RIBBON LIFT CONTROL signal discussed above.

OUTPUT SIGNALS

1. READY — five lines included in a status bus 130 respectively transmit the status of the several operation parts of the printer 10 to the controller 124 when enabled by the SELECT PRINTER signal as alluded to above. The five ready signals are PRINTER READY, P.W. READY, CARR. READY, P.F. READY and OPTION READY. The PRINTER READY signal indicates that the printer is receiving proper input power, while the others indicate that their associated circuits are in condition to receive and execute commands.

2. CHECK — This signal indicates that a previously received print wheel or carriage command was not successfully completed, due to a malfunction. The presence of this signal will cause all printer activity to be stopped and the print wheel, carriage and paper feed ready lines to be disabled. Only a restore sequence, whether initiated by the controller 124 by a RESTORE signal or by removal and reapplication of power, will clear a CHECK condition.

3. OPTION STATUS — There are three option status lines included in the status bus 130 for respectively transmitting the following optional detection signals, if appropriate detectors (not shown) are included in the printer: PAPER OUT, COVER OPEN and END-OF-RIBBON.

Before reviewing in detail the nature of the interface logic 78 and processor 76, it would be helpful to understand the timing relationships between various of the signals discussed above. As a general proposition, it must be noted that the print wheel 42 will be rotated to a desired character position, the carriage assembly 44 moved to a desired linear position and the platen 16 or option paper feeder advanced only when the corresponding DATA TAG signal is presented on the data tag bus 128 to the interface logic 78.

Figure 5:
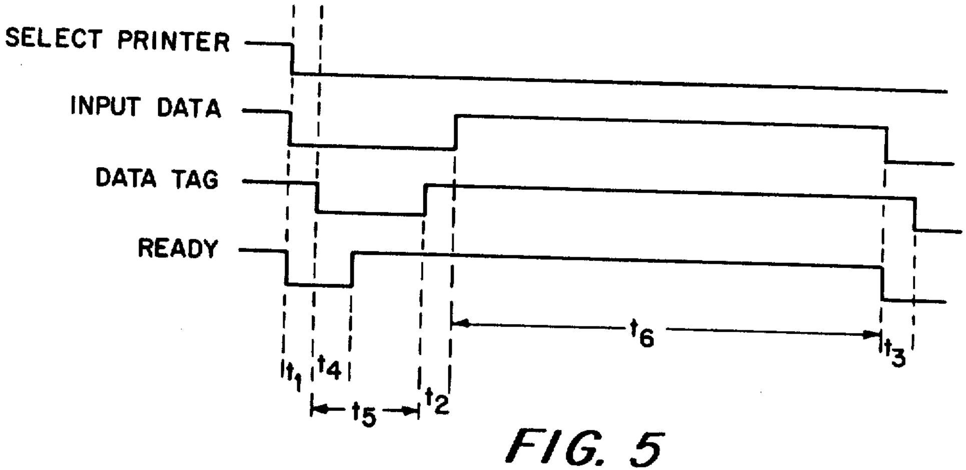
FIG. 5 is a timing diagram showing the relationship of various signals received by the interface logic as shown in FIG. 3.

Referring then to FIG. 5, a typical timing diagram is shown depicting the relationship between the SELECT PRINTER, INPUT DATA and corresponding DATA TAG and READY signals. Timing for the carriage movement commands and the paper feed movement commands are exactly the same. The corresponding READY signal must be true (LO) prior to the application of the corresponding DATA TAG signal, or the command will be lost. As will be described in more detail below, the receipt of a ribbon feed command from the controller 124 will cause the P.W. READY status to change. The time periods *t*1, *t*2, and *t*3 are desirably less than or equal to 200 us, time period *t*4 greater than or equal to 200 us, and time period *t*5 greater than or equal to 1 us. Time period *t*6 will depend on the execution time of the input data command. A DATA TAG signal received when the associated READY signal is false (HI) will be ignored.

DATA TAG signals identifying input data as relating to the print wheel 42, carriage assembly 44 and paper feed assembly 114 can be received by the printer 10 with a minimum separation of 400 us between them due to the internal cycle speed of the preferred processor 76. In accordance with specific circuitry included in the interface logic 78, DATA TAG signals received by the printer 10 will be executed in the order of receipt. In view of the 400 us separation time, however, the processor 76 is capable of effecting simultaneous control and movement of the print wheel 42, carriage assembly 44 and paper feed assembly 114. Nonetheless, during hammer firing portion of its cycle, execution of a print wheel movement command will inhibit execution of any new paper feed or carriage movement command.

More specifically, the print wheel cycle, on execution of print wheel movement command, is divided into two sub-cycles, i.e. (1) rotation of the print wheel until the selected character element is brought into alignment with the hammer assembly 60, and (2) actuation of the hammer assembly. Hammer firing will take place only when the print wheel 42, carriage assembly 44, ribbon feed 112, and paper feed assembly 114 are all at rest. During the hammer firing subcycle, any pending print wheel rotation, carriage movement or paper feed is deferred until completion of the character print.

In accordance with the preferred embodiment and as will be described in more detail below in connection with FIG. 6, a CARR. DATA TAG signal which is followed (400 ns later) by a P.W. DATA TAG signal will cause the carriage assembly 44 and the print wheel 42 to move simultaneously in accordance with the corresponding print wheel and carriage movement command input data received. Printing will occur when both the carriage and print wheel have been fully stopped. This sequence will be hereafter referred to as a "space-before-print" sequence. On the other hand, a P.W. DATA TAG signal followed by a CARR. DATA TAG signal will cause the print wheel 42 to rotate and the character to be printed prior to the carriage motion for the first character, i.e. movement of the carriage assembly 44 one character space increment (1/60th or 1/120th of an inch). From that point on, however, motion will be overlapped, and thus simultaneous. This sequence shall be hereafter referred to as the "space-after-print" sequence. The time to print a line of characters in accordance with both sequences will be the same since, in the space-after-print sequence, after the first character has been printed, further movement of print wheel and movement of the carriage will be overlapped.

Figure 3A:
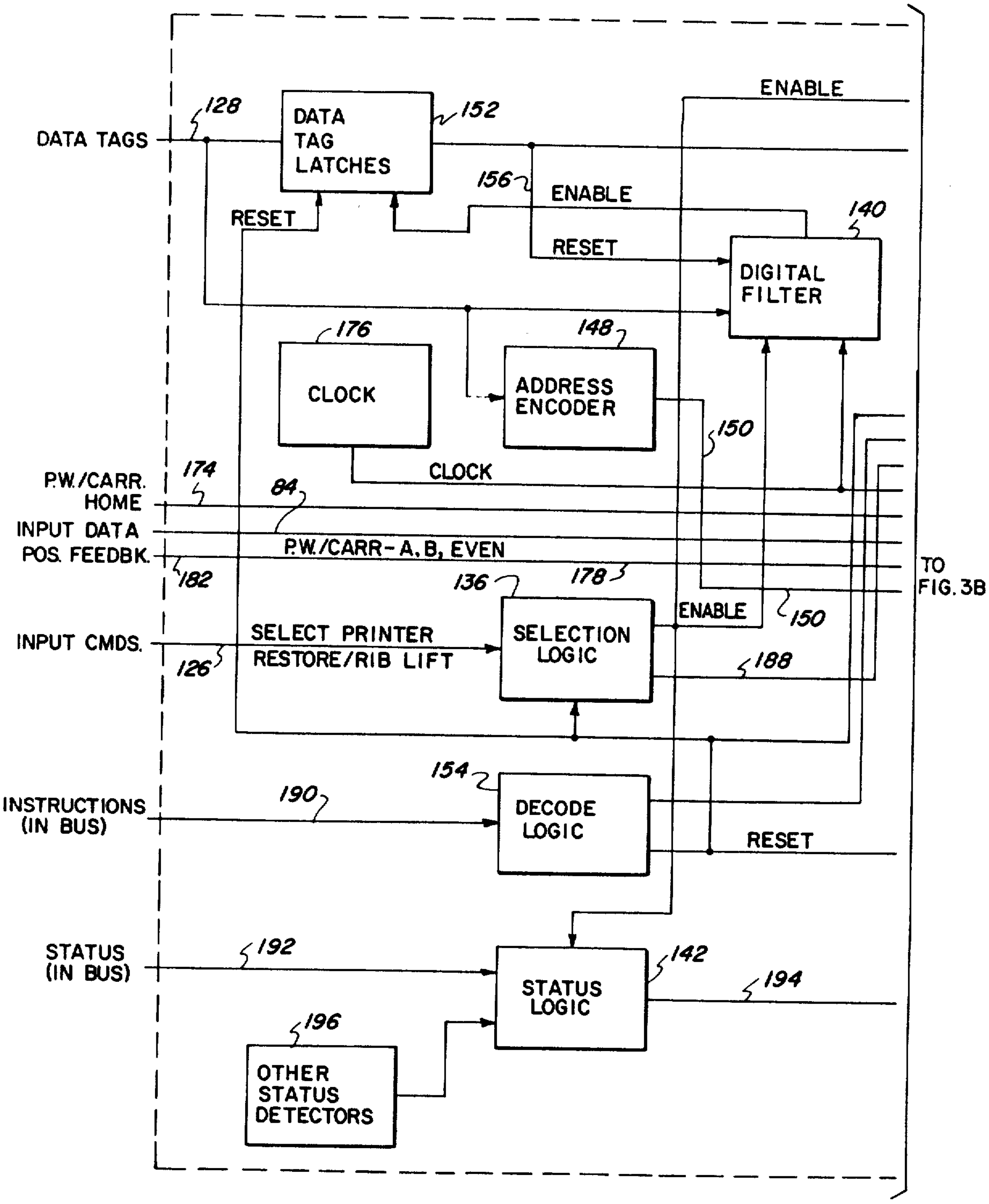
FIG. 3 is a schematic block diagram of the interface logic shown in FIG. 2.
Figure 3B:
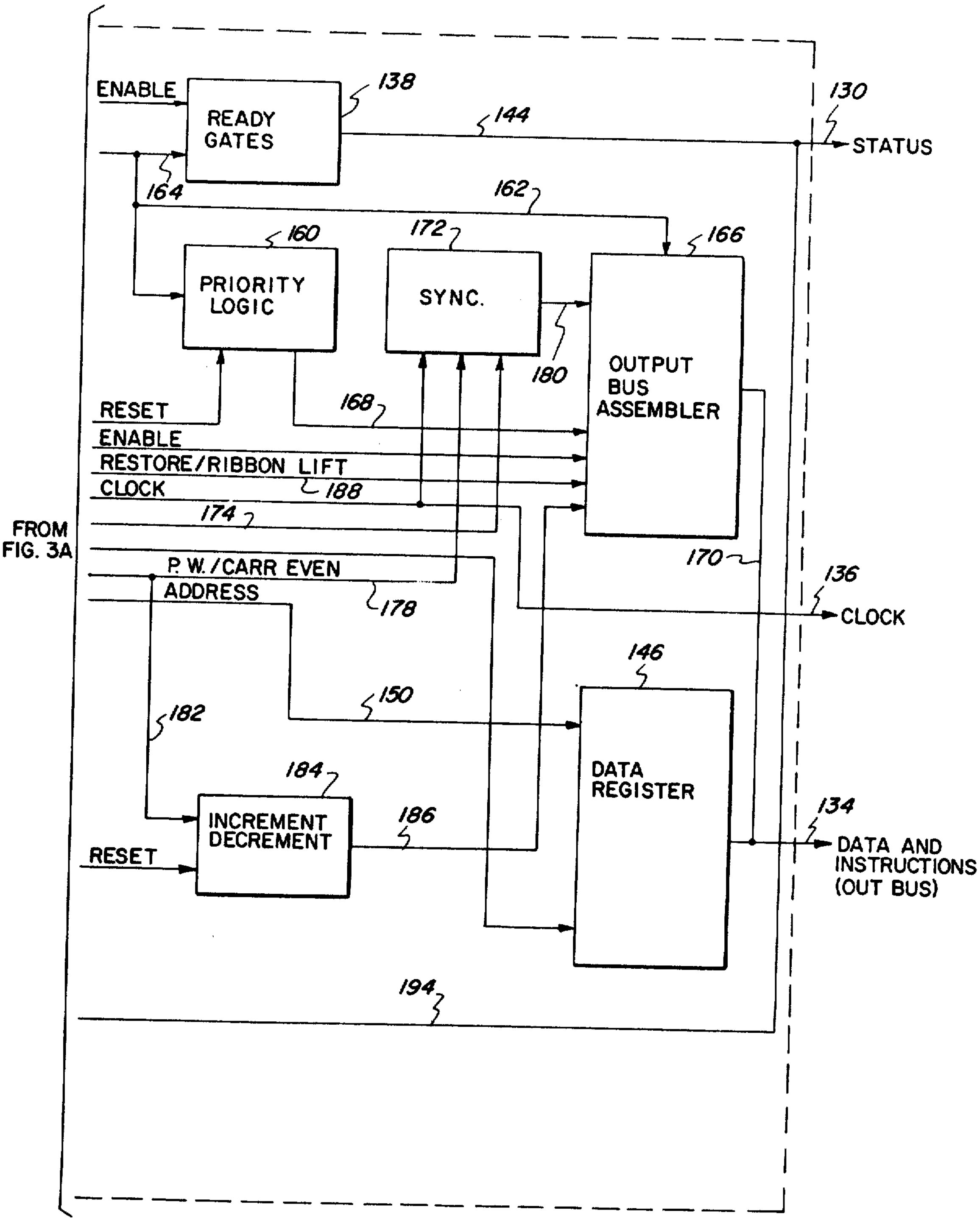

Reference is now had to FIG. 3 for a description of the interface logic 78 shown in FIG. 2. Generally speaking, the interface logic receives all of the above-identified input signals from the host controller 124 and transmits all of the above-identified output signals to the host controller 124. Additionally, it receives the HOME position signals from the home detectors 82 and 118. It further receives instructions from the processor 76 along an IN bus 132, supplies input data and instructions to the processor 76 along the OUT bus 134, and supplies a CLOCK signal along a clock line 135 to the processor 76.

Upon proper application of power to the printer 10, all internal logic in the printer is reset to zero and the control program initiates a restore cycle to initialize both the print wheel 42 and the carriage assembly 44. When this has been accomplished, an internal signal called POWER ON, which is developed by the power-on monitor circuit 77 (FIG. 2), goes true, enabling the printer 10 to process incoming commands and data. The printer 10 can accept such commands and data, however, only after it has been "selected" by the host controller 124 by forwarding a SELECT PRINTER signal along the input command bus 126 to a selection logic circuit 136 included in the interface logic 78. As used herein, a particular signal going "true" will be synonymous with description of the signal being "present" or "generated".

In response to the SELECT PRINTER signal, the selection logic applies an ENABLE signal along appropriate lines to a plurality of ready gates 138, an input of a digital filter circuit 140 and an input of a status logic circuit 142. There are desirably four ready gates (not shown) included in the block 138, each having a separate output line wherein the four output lines constitute a ready bus 144, which bus forms part of the status bus 130 connected to the host controller 124. The four ready gates 138 respectively generate the P.W. READY, CARR. READY, P.F. READY and OPTION READY signals discussed earlier. These four signals will be generated only when the ENABLE signal from the selection logic 136 goes true and the interface logic 78 is able to receive new DATA TAG signals in a manner to be described below. It is only when the printer 10 has been selected and ALL READY signals are true that the printer can accept input data and commands from the controller 124. The digital filter circuit 140 and the status logic circuit 142 alluded to above all will be described in more detail below.

Assuming the printer 10 has been selected and all four ready lines are true, such READY status being indicated to the controller 124 along the status bus 130, input data can be loaded into the interface logic 78 along input data bus 84. This data will be loaded into corresponding address locations in one or more data registers 146 included in the interface logic 78. The DATA TAG signal identifying the nature of the input data determines the address location at which the incoming input data is stored in the registers 146. More specifically, each incoming DATA TAG signal is applied to an address encoder 148 which generates an ADDRESS signal at its output. This ADDRESS signal is applied in bit parallel format on an address bus 150 to respective inputs of data registers 146 in order for the incoming data to be loaded into a proper address in the registers. As will be noted from FIG. 5, the DATA TAG signal corresponding to the entered input data will arrive at the address encoder 148 at a time, $t_1$, after the data is entered and remain true for a time period $t_5$.

A DATA TAG signal entering the printer 10 on data tag bus 128 is also applied to a corresponding one of a plurality of data tag latches 152. There are desirably four data tag latches included in the functional block 152 which are respectively designed to receive the P.W. DATA TAG, CARR. DATA TAG, P.F. DATA TAG and OPTION DATA TAG signals alluded to above. Each data tag latch is enabled for a predetermined time interval by an ENABLE signal supplied thereto from the digital filter circuit 140. The duration of this ENABLE signal is desirably no less than 50ns or greater. All four data tag latches 152 can be reset by a RESET signal applied thereto from a decode logic circuit 154 to be described in more detail below.

Now then, when a particular data tag latch 152 is in a reset, but enabled state, the corresponding DATA TAG signal will be loaded into and set the corresponding latch. When set, the high (Q) output of the latch will go true and remain true until the next RESET signal is received from the decode logic 154. The Q output of each data tag latch is connected along a bus 156 to the digital filter 140 for resetting same. Additionally, the Q outputs of all four data tag latches 152 are coupled along a bus 162 to an output bus assembler 166, also to be discussed in more detail below. The low ($\overline{Q}$) outputs of all four data tag latches are coupled along a bus 164 to respective second inputs of the four ready gates 138, it being recalled that the first inputs of these gates receive the ENABLE signal from the selection logic 136. When a DATA TAG signal is received and the corresponding latch 152 set, the resultant $\overline{Q}$ output of the latch as applied along the bus 164 will disable the respective gate 138.

Any suitable set of data latches and any suitable digital filter circuit 140 capable of operating in the above manner may be utilized in accordance with the present invention. Presently preferred circuit arrangements, however, are disclosed in Appendix A hereto.

The priority logic 160 alluded to above has the main purpose of setting the order in which input data is to be operated upon by the processor 76. More specifically, it will be recalled that input data and DATA TAG signals can be received as close together as 400 ns. By reason of this time interval in comparison with the normal processor service cycle time of about 100 us, it is apparent that input data and associated DATA TAG signals relating to more than one controllable element, e.g. print wheel 42, carriage assembly 44 and paper feed assembly 114, can be received before the processor 76 next interrogates the interface logic 78 for the next input data received. Accordingly, a priority must be established in order for the processor 76 to execute the movement commands defined by incoming data.

Accordingly, the priority logic 160 functions to forward various priority signals along a bus 168 to the output bus assembler 166 dependent upon the order of receipt of incoming data, as determined by the order of incoming DATA TAG signals. More specifically, if a P.W. DATA TAG signal is received followed by a CARR. DATA TAG signal, a true PBH (carriage space-after-print sequence) signal will be generated. If a CARR. DATA TAG signal is received followed by a P.W. DATA TAG signal, a false PBH (carriage space-before-print sequence) signal will be generated. If a P.W. DATA TAG is received followed by a P.F. DATA TAG, a true PBV (paper feed-after-print sequence) signals will be generated, and if a P.F. DATA TAG signal is received followed by a P.W. DATA TAG signal, a false PBV (paper feed-before-print sequence) signal will be generated. Lastly, if a CARR. DATA TAG signal and a P.F. DATA TAG signal are received in either order before a P.W. DATA TAG signal, both the PBH and PBV signals will be false. The priority logic 160 is reset by the RESET signal generated by the decode logic 154. In a reset mode, both the PBH and PBV signals will be false. A presently preferred priority logic circuit 160 will be decribed in more detail below in connection with FIG. 6.

Still referring to FIG. 3, we have thus far described the handling of incoming input data on bus 84 and DATA TAG signals on bus 128. Reference is now had to the handling of the other incoming signals as shown in FIG. 2. Referring first to the P.W. HOME and CARR. HOME signals, they are applied along a bus 174 to a synchronizing (sync.) circuit 172. The sync. circuit 172 synchronizes the P.W. HOME and CARR. HOME signals with a system CLOCK signal as applied to the sync. circuit 172 from a suitable clock circuit 176. Synchronization is necessary due to the processor 76 being timed by the CLOCK signal which is applied along the clock line 136 to the processor 76.

The P.W. EVEN and CARR. EVEN signals are also applied to sync. circuit 172 along a bus 178 derived from a bus 182 to be discussed below. As with the P.W. HOME and CARR. HOME signals, the sync. circuit 172 synchronizes the P.W. EVEN and CARR. EVEN signals with the CLOCK signal. The four synchronized P.W. HOME, P.W. EVEN, CARR. HOME and CARR. EVEN signals are applied along a suitable bus 180 to respective inputs of the output bus assembler 166.

All six position feedback signals, i.e. P.W. POSITION A, P.W. POSITION B, P.W. EVEN, CARR. POSITION A, CARR. POSITION B, CARR. EVEN, are applied along the bus 182 to an increment-decrement logic circuit 184. Generally speaking, the increment-decrement circuit 184 is divided into two main portions. A first portion generates decrement counting pulses for application to a difference software counter in the processor 76 keeping track of the difference between actual and desired carriage positions. Each time the carriage assembly 44 is moved a predetermined increment, e.g. 1/120th inch, toward the desired stopping position, a decrement pulse is applied by the circuit 184 along a bus 186 for application to the output bus assembler 166 and then along busses 170 and 134 to the processor 76.

A second portion of the circuit 184 generates either decrement or increment counting pulses for application to an absolute software counter in the processor 76 keeping track of the actual rotational position of the print wheel. Each time the print wheel 42 is rotated another character space in either direction, either an increment or decrement pulse is applied on the bus 186 to the output bus assembler 166. The circuit 184 must supply increment as well as decrement pulses to the absolute software counter in the processor 76 due to the fact that the print wheel 42 is always rotated 180° or less, i.e. it is always rotated through the shortest arc to reach the desired rotational stopping position. Details of a preferred increment-decrement circuit 184 will be described in more detail below in connection with FIG. 7.

Reference is now had to the remaining input commands forwarded on bus 126 to the printer 10, the SELECT PRINTER signal already being discussed above. These remaining input command signals include RESTORE and RIBBON LIFT and are supplied along the bus 126 to respective inputs of the selection logic 136. Th selection logic includes a restore latch (not shown) which is set upon application thereto of the RESTORE signal for forwarding a RESTORE signal to the output bus assembler 166 along a bus 188. The selection logic 136 also includes suitable coupling logic (not shown) for forwarding the RIBBON LIFT signal on the bus 188 to the output bus assembler 166. The RESTORE latch in the selection logic 136 is reset upon application of a RESET signal thereto from the decode logic 136. As discussed previously, the processor 76 responds to a RESTORE signal to initialize the carriage and print wheel and reset all internal logic. Additionally, the processor 76 responds to a RIBBON LIFT signal to lift the ribbon in the cartridge 62 so that different colored ink can be printed.

What remains to be discussed in relation to the interface logic 78 are the signals received thereby from the processor 76 along the IN bus 132 (FIG. 2). As shown in FIG. 3, these signals can be catagorized as instructions and status signals respectively applied along busses 190 and 192 to the decode logic circuit 154 and status logic circuit 142, respectively, The busses 190 and 192 together define the IN bus 132.

Referring first to the status signals applied on bus 192 to the status logic 142, these include CHECK, indicative of a malfunction in the printer, as explained above, and PRINTER READY, indicative of proper power being applied to the printer 10. The status logic includes a plurality of status gates (not shown), wherein two are adapted to respectively receive the CHECK and PRINTER READY status signals from the processor 76. These signals, when present, will be gated through the respective gates onto a bus 194 and then onto the status bus 130 for application to the controller 124 only if the gates are first enabled by an ENABLE signal applied thereto from the selection logic 136, as shown in FIG. 3. The ENABLE signal will go true when the SELECT PRINTER signal has been received by the selection logic 136.

Among the plurality of status gates in the status logic 142 include those for receiving such other status signals as RIBBON OUT, PAPER OUT and COVER OPEN. These signals are developed at the outputs of suitable detectors 196 appropriately located in the printer 10. As such detectors are entirely conventional, they will not be described in detail herein. The RIBBON OUT, PAPER OUT and COVER OPEN signals, when present, will be gated through their respective gates for application to the controller 124 along the busses 194 and 130 only if such gates have first been enabled by the selection logic 136, as described above.

The decode logic 154 receives various instructions from the processor 76 along the bus 190 which, as indicated above, forms part of the IN bus 132. As will be described in more detail in connection with FIG. 4, the instructions forwarded on bus 190 are derived from a program ROM 196 and from an instruction decoder 198, both of which are included in the processor 76. In response to appropriate instructions, the decode logic 154 is capable of generating a RESET signal for application to the increment-decrement logic 184, the priority logic 160, the selection logic 136, and the data tag latches 152 in order to reset all flip-flop circuits therein. Additionally, and in response to appropriate instructions, the decode logic 154 generates an ENABLE signal which is applied to the output bus assembler 166 for enabling same, i.e. for enabling the instructions loaded therein to be forwarded onto the bus 170 and then transmitted to the processor 76 along the OUT bus 134. Although any suitable decode logic circuit can be utilized in accordance with the present invention, a presently preferred decode logic circuit is disclosed in Appendix A hereto. Generally speaking, the decode logic is preferably constituted by one or more conventional decimal decoder registers, such as the pair of decimal decoders shown in Appendix A.

The output bus assembler 166 receives a number of input instructions from various circuits in the interface logic 78, which instructions are gated onto the bus 170 in response to an ENABLE signal from the decode logic 154. These input instructions include:

1. DATA TAG signals as applied to the assembler 166 on the bus 162 from the latches 152;
2. HOME and EVEN signals as applied to the assembler 166 on the bus 180 from the sync. circuit 172;
3. PBH and PBV priority signals as applied to the assembler 166 on the bus 168 from the priority logic 160;
4. RESTORE and RIBBON LIFT signals as applied to the assembler 166 on the bus 188 from the selection logic 136; and
5. P.W. INCR., P.W. DECR. and CARR. DECR. counting pulses as applied to the assembler on the bus 186 from the increment-decrement logic 184.

Any suitable output bus assembler capable of carrying out the desired functions as above-described can be used in accordance with the present invention. A presently preferred output bus assembler is disclosed in Appendix A hereto. Generally speaking, the output bus assembler may be comprised of one or more line driver registers, such as three, as shown in Appendix A.

Figure 6:
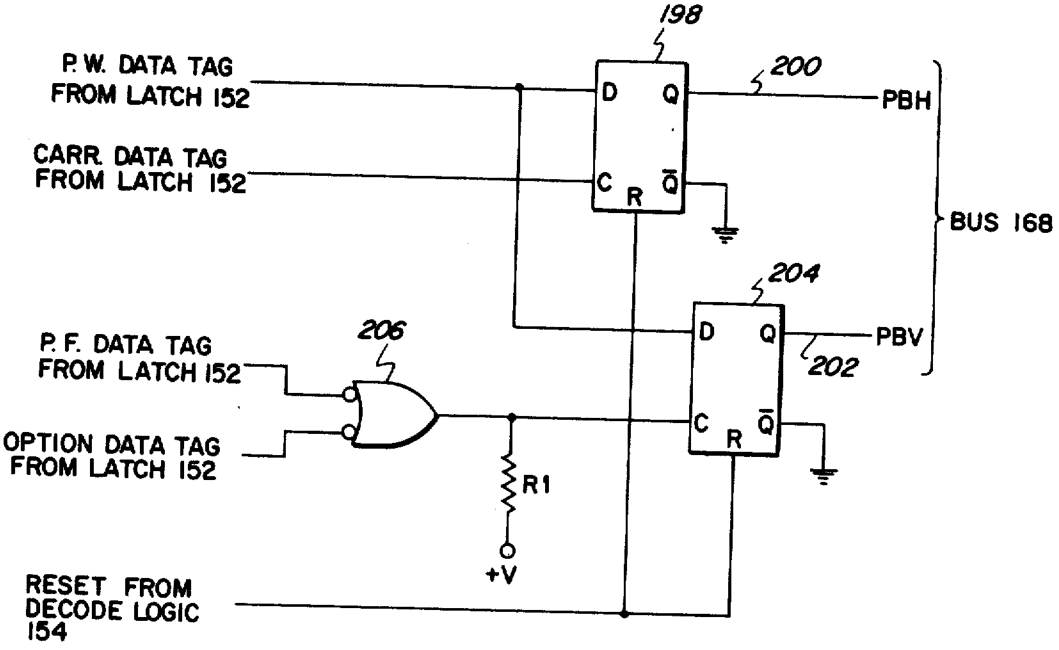
FIG. 6 is a schematic circuit diagram of the priority logic depicted generally in FIG. 3.

Reference is now had to FIG. 6 where a presently preferred priority logic circuit 160 will be described in detail. As shown, the priority logic 160 includes a first D-C flip-flop 198 having its D input connected to the Q output of the print wheel data latch 152 for receiving a P.W. DATA TAG signal therefrom. The C input of the flip-flop 198 is connected to the Q output of the carriage data tag latch 152 for receiving the CARR. DATA TAG signal therefrom. The $\overline{Q}$ output of the flip-flop 198 is grounded and the Q output is connected to a first line 200 of two lines 200 and 202 constituting the bus 168 for applying the PBH signal to the ouput bus assembler 166. The PBH signal will be true when a P.W. DATA TAG is first received followed by a CARR. DATA TAG since, in the event, the flip-flop 198 will be set by clocking the P.W. DATA TAG signal with the CARR. DATA TAG signal. When a CARR. DATA TAG signal is first received, however, there will be no true signal at the D input to clock in, so that the flip-flop is not set and the PBH signal will be false. As will be recalled, when the PBH signal is true, it signifies a carriage space-after-print sequence, whereas when it is false, it signifies a carriage space-before-print sequence.

Still referring to FIG. 6, the priority logic further includes a second D-C flip-flop 204 having its D input connected to the Q output of the print wheel data tag latch 152 for receiving the P.W. DATA TAG signal, and its C input connected to the output of a NOR-gate 206 and to a d-c source voltage +V through a coupling resistor R1. The voltage +V is applied to bring the level of the NOR-gate output to that of the data tag latches 152.

A first input of the NOR-gate 206 is connected to the Q output of the paper feed data tag latch 152 for receiving a P.F. DATA TAG signal therefrom and a second input of the NOR-gate 206 is connected to the Q output of the option data tag latch 152 for receiving an OPTION DATA TAG signal therefrom. The $\overline{Q}$ output of flip-flop 204 is grounded and the Q output is connected to the line 202 of bus 168 for applying a PBV signal to the output bus assembler 166. The PBV signal will be true when a P.W. DATA TAG signal is received at the D input before either a P.F. DATA TAG signal or an OPTION DATA TAG signal is received at the NOR-gate 206. During the time that neither of the latter two signals is received by the NOR-gate, its output will be true, thereby insuring the flip-flop 204 will be set as soon as the P.W. DATA TAG signal is received. The PBV signal will be false, however, if either the P.F. DATA TAG signal or the OPTION DATA TAG signal is received prior to receipt of a P.W. DATA TAG signal, since the C input of flip-flop 204 will be false, preventing the flip-flop from being set when the P.W. DATA TAG signal is received at the D input. As will be recalled, a true PBV signifies an instruction to print before vertical movement (by paper feed or option tractor feed) and a false PBV signifies an instruction to feed paper before printing.

Both flip-flops 198 and 204 are simultaneously reset by the RESET signal applied to the R inputs of each from the decode logic 154 (see FIG. 3). Resetting occurs under program control during the "power-on" and initialization stages, as well as after each time the PBH and PBV signals have been forwarded to and received by the processor 76, thereby readying the flip-flops 198 and 204 for receipt of further DATA TAG signals.

Reference is now had to FIGS. 7 – 9B where a presently preferred increment-decrement logic circuit 184 will be described in detail. As indicated previously, the circuit 184 is divided into a first portion for generating CARR. DECR. pulses to decrement the carriage difference software counter in the processor 76, and a second portion for generating P.W. INCR. and P.W. DECR. pulses to respectively increment or decrement the print wheel absolute software counter in the processor 76 keeping track of the actual rotational position of the print wheel 42.

Figure 8:
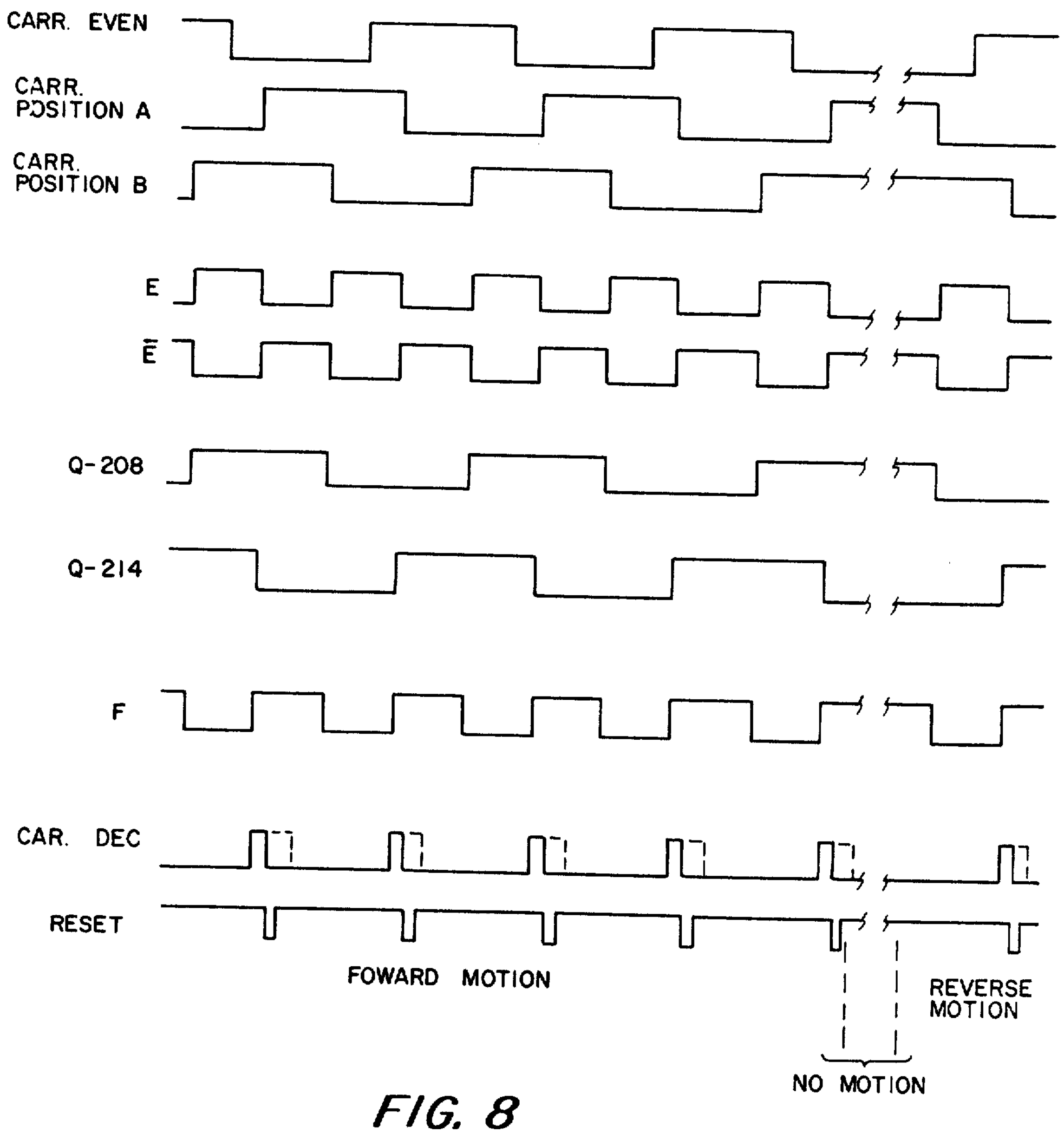
FIG. 8 depicts waveforms of various signals developed by a carriage portion of the increment-decrement logic of FIG. 7.

Referring to the first portion, it includes a first D-C flip-flop 208 having its D input connected to the shaping circuit 100 (FIG. 2) for receiving the CARR. EVEN signal and its C input connected to the output of an Exclusive OR-gate 210. The OR-gate 210 has first and second inputs connected to the shaping circuit 100 for respectively receiving the CARR. POSITION A and CARR. POSITION B signals. An output signal E from the OR-gate 210 will be true only when either but not both the CARR. POSITION A and CARR. POSITION B signals are true, as shown in FIG. 8. The Q output of the flip-flop 208 is connected to one input of another Exclusive OR-gate 212 and the reset (R) input of the flip-flop 208 is connected to the source voltage +V through a coupling resistor R3.

The first portion of circuit 184 also includes a second D-C flip-flop 214 having its D input also connected to the shaping circuit 100 for receiving the CARR. EVEN signal. The C input is connected to the output of the OR-gate 210 through an inverter 216 for receiving a signal $\overline{E}$. The Q output is connected to a second input of the OR-gate 212. The reset (R) input, like the R input of flip-flop 208, is connected to the source voltage +V through the coupling resistor R3. The flip-flops 208 and 214 are of the type which are reset by a LO level signal. Consequently, since their R inputs are tied HI, the Q output signals will be as depicted in FIG. 8. The output signal F from the Exclusive OR-gate 212 is also depicted in FIG. 8.

A third D-C flip-flop 218 included in the first portion of circuit 184 has its D input tied to the source voltage +V through a coupling resistor R2. The C input is connected to the output of the OR-gate 212 for receiving the signal F therefrom. The reset (R) input is connected to the decode logic 154 for receiving a RESET CARR. X signal therefrom. The resultant Q output signal from the flip-flop 218 is the CARR. DECR. signal shown in FIG. 8. As mentioned previously, the CARR. DECR. pulses are applied along the bus 186 to the output bus assembler 166 for eventual application to the processor 76.

The second portion of the increment-decrement logic circuit 184 deals with generating P.W. INCR. and P.W. DECR. pulses for application to the processor 76. To reiterate the need for both increment and decrement pulses, it will be recalled that where the carriage assembly 44 can only move in one direction to get to its desired linear position, the print wheel 42 can rotate in two directions, but the processor 76 instructs rotation to never be more than 180° so that the desired rotation position is reached in the shortest arc. Thus, in some instances the absolute software counter will have to be incremented instead of decremented. As will be described in more detail below, the second portion of circuit 184 inhibits the generation of an unwanted increment or decrement pulse during return from a print wheel overshoot by the print wheel servo system.

Figure 7A:
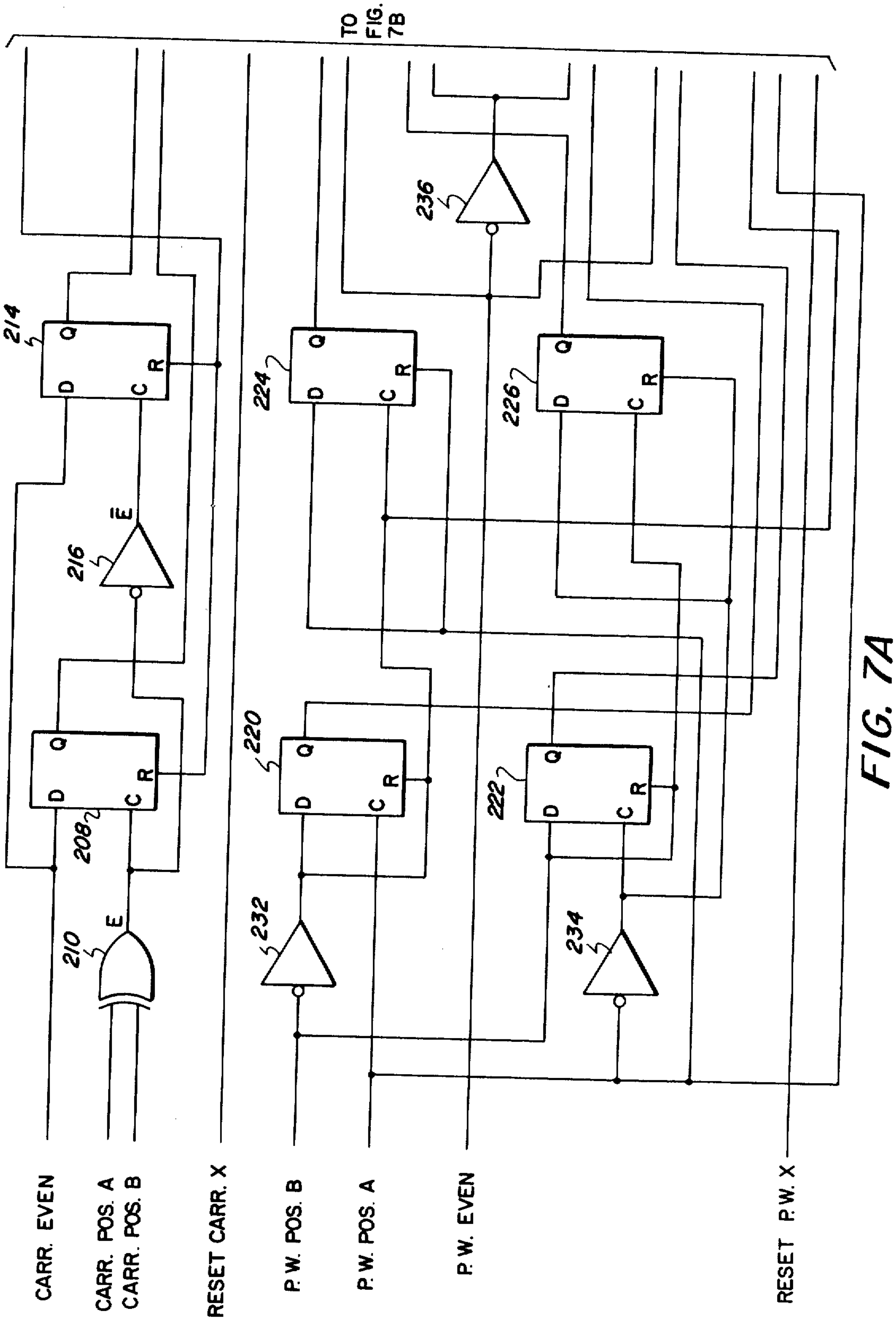
FIG. 7 is a schematic circuit diagram of the increment-decrement logic depicted generally in FIG. 3.
Figure 7B:
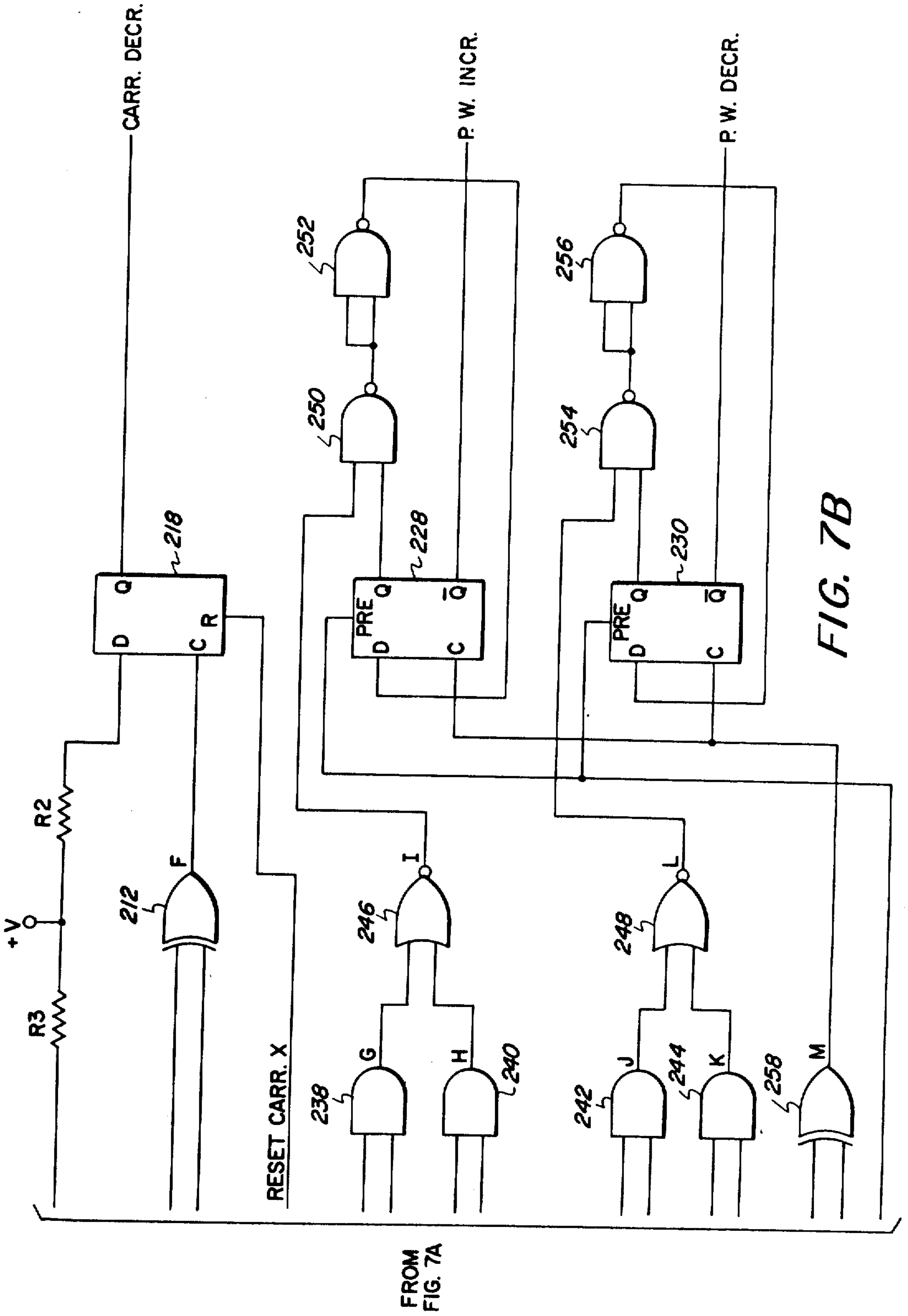

Still referring to FIG. 7, the second portion of circuit 184 includes six D-C flip-flops 220 – 230, three inverters 232 – 236, four AND-gates 238 – 244, two NOR-gates 246 and 248, four NAND-gates 250 – 256 and an Exclusive OR-gate 258. The P.W. POSITION A signal from the shaping circuit 76 (FIG. 2) is applied to the C input of the flip-flop 220, to the D and R inputs of the flip-flop 224, to one input of the Exclusive OR-gate 258, and through the inverter 234 as a $\overline{\text{P.W. POSITION A}}$ signal to the C input of flip-flop 222 and the D and R inputs of the flip-flop 226.

The P.W. POSITION B signal from the shaping circuit 72 is applied to the D and R inputs of the flip-flop 222, the C input of flip-flop 226 and through the inverter 232 as a $\overline{\text{P.W. POSITION B}}$ signal to the D and R inputs of flip-flop 220, the C input of flip-flop 224 and a second input of the Exclusive OR-gate 258. The P.W. EVEN signal from the shaping circuit 72 is applied to first inputs of the AND-gates 238 and 244, and through the inverter 236 as a $\overline{\text{P.W. EVEN}}$ signal to first inputs of the AND-gates 240 and 242. Lastly, a RESET P.W. X signal is applied from the decode logic 154 under program control to the preset (PRE) inputs of the flip-flops 228 and 230, i.e. the flip-flops 228 and 230 are normally in a set condition, unlike the flip-flops 220, 222, 224 and 226.

The Q outputs of the flip-flops 220 and 222 are applied to respective second inputs of the AND-gates 242 and 242, while the Q outputs of the flip-flops 224 and 226 are applied to respective second inputs of the AND-gates 238 and 240. The outputs of the AND-gates 238 and 240 are respectively applied to first and second inputs of the NOR-gate 246, whereas the outputs of the AND-gates 242 and 244 are respectively applied to first and second inputs of the NOR-gate 248.

The Q outputs of the flip-flops 228 and 230 are applied to respective first inputs of the NAND-gates 250 and 254. The outputs of the NOR-gates 246 and 248 are applied to respective second inputs of the NAND-gates 250 and 254. The output of NAND-gate 250 is applied to both inputs of a NAND-gate 252, which thus functions as an inverter, and the output from NAND-gate 252 is applied in feedback fasion to the D input of the flip-flop 228. Correspondingly, the output of the NAND-gate 254 is applied to both inputs of the NAND-gate 256, the output of which is coupled in feedback fashion to the D input of the flip-flop 230. The NAND-gates 250 – 256 function as delay logic to delay by a two-gate time period the resetting of the data for the flip-flops 228 and 230, it being noted that the $\overline{Q}$ outputs of such flip-flops respectively develope the P.W. INCR. and P.W. DECR. signals for application on bus 186 to the output bus assembler 166.

Figure 9A:
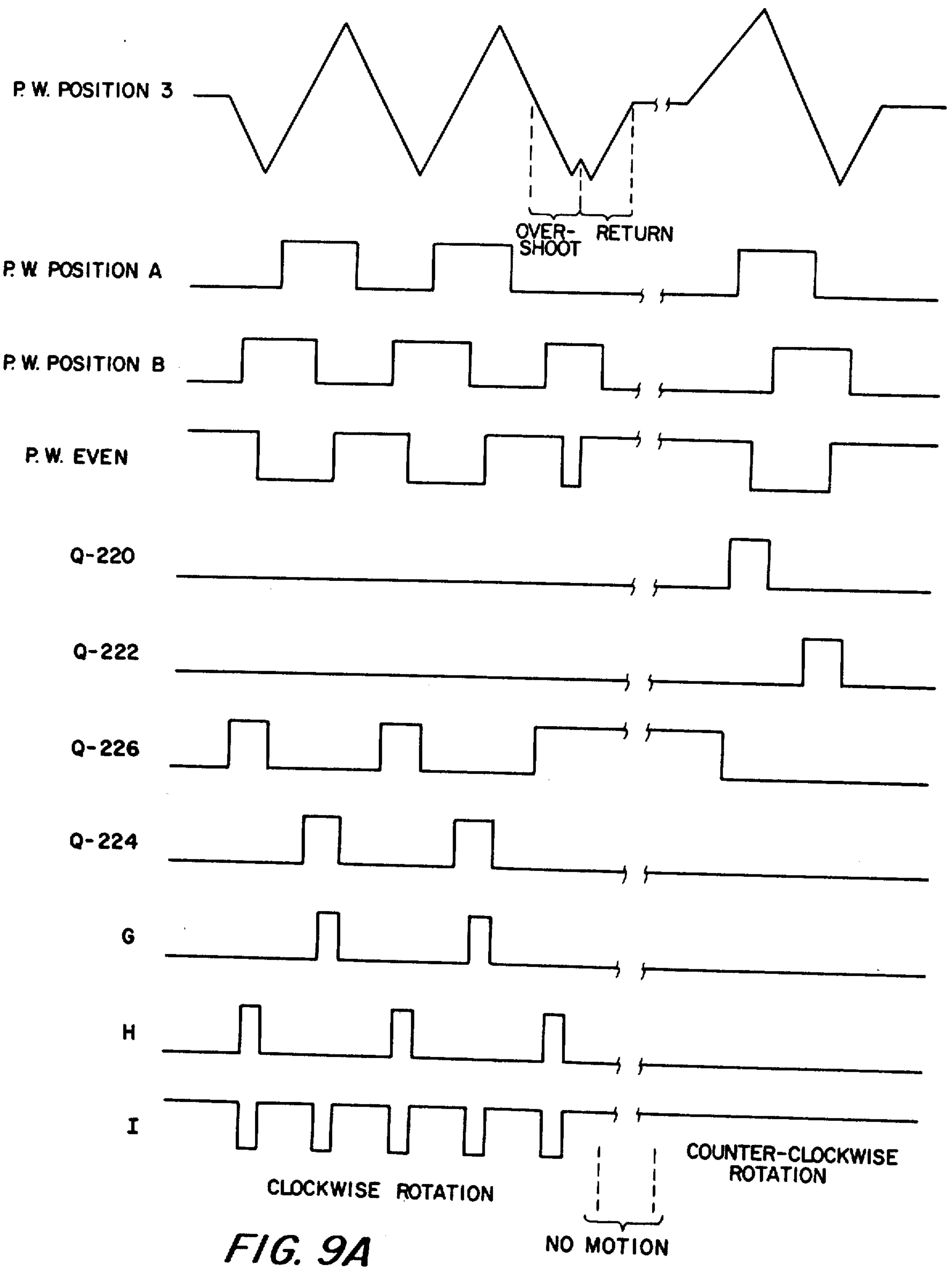
FIGS. 9A and 9B depict waveforms of various signals developed by a print wheel portion of the increment-decrement logic of FIG. 7.
Figure 9B:
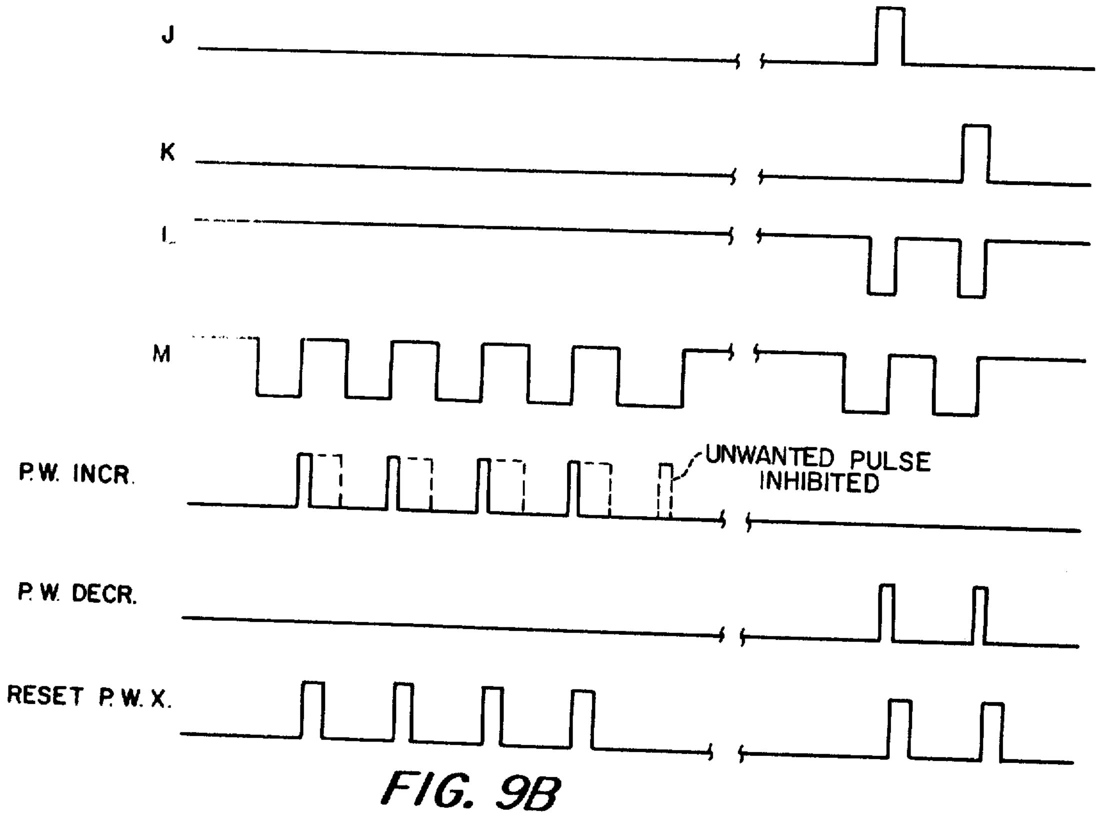

Waveforms for various of the signals utilized and developed by the second portion of circuit 184 are depicted in FIGS. 9A and 9B. Due to the specific logic configuration utilized, particularly the operation of flip-flops 228 and 230, the occurence of an unwanted counting pulse during a return from an overshoot condition is inhibited. An exemplary overshoot condition is shown in FIG. 9A where a negative peak of the P.W. POSITION 3 signal is passed, but the next zero-crossing is not reached. At this negative peak, the P.W. EVEN signal will go false. As soon as the servo starts a return rotation, however, the P.W. EVEN signal will go true at the next negative peak. In prior art increment-decrement logic designs, this relationship would cause an unwanted P.W. INCR. PULSE to be generated which would cause the print wheel servo system to re-enter the velocity mode of operation. Due to the specific configuration and operation of the flip-flops 228 and 230, the waveforms of the inputs thereto and outputs therefrom being depicted in FIGS. 9A and 9B, the unwanted pulse is inhibited during a return from an overshoot in either direction of rotation.

With specific reference now to the operation of the print-wheel portion of circuit 184, the Q output of flip-flop 220 will go HI whenever a HI $\overline{\text{P.W. POSITION B}}$ signal is clocked by a HI P.W. POSITION A signal, and will return to a low state as soon as the $\overline{\text{P.W. POSITION B}}$ signal goes LO, since that signal is also coupled to the reset (R) input of the flip-flop 220, which resetting occurs when the R input is LO. The Q output of the flip-flop 220 is depicted in FIG. 9A, as are the Q outputs of flip-flops 222, 224 and 226, which latter outputs are developed in an entirely analogous manner.

The output of the NOR-gate 246 signal I (FIG. 9A) is forwarded to the D input of the flip-flop 228 through the delay circuit comprised of NAND-gates 250 and 252. This signal is clocked into the flip-flop 228 by the output of the Exclusive OR-gate 258, i.e. signal M (FIG. 9B). The resultant $\overline{Q}$ output is the P.W. INCR. signal where it will be noted that the unwanted pulse that would normally have occurred during the return from overshoot is inhibited. Similarly, the output of the NOR-gate 248, signal L (FIG. 9B), is applied to the D input of the flip-flop 230 through the delay gates 254 and 256. This signal is also clocked by the signal M output of the Exclusive OR-gate 258 with the resultant $\overline{Q}$ output, i.e. the P.W. DECR. signal, being depicted in FIG. 9B.

It must again be noted that the print wheel portion of circuit 184 is designed to inhibit the occurrence of a counting pulse during an overshoot in one direction that would not normally be offset by a corresponding counting pulse during the return movement in the opposite direction. As noted in the exemplary overshoot in FIGS. 9A and 9B, an extra P.W. INCR. pulse would normally have occurred that would not be offset by a P.W. DECR. pulse during the return movement. The unique configuration of circuit 184 inhibits this extra pulse. If the occurrence of a P.W. INCR. pulse during overshoot would be offset by a corresponding P.W. DECR. pulse during return, then neither such P.W. INCR. pulse nor such P.W. DECR. pulse would be inhibited. The main benefit of the subject circuit is the ability to inhibit the extra P.W. INCR. pulse during an overshoot of less distance than would normally effect an offsetting P.W. DECR. pulse during return so that the print wheel servo does not return to the velocity mode of operation.

Figure 4:
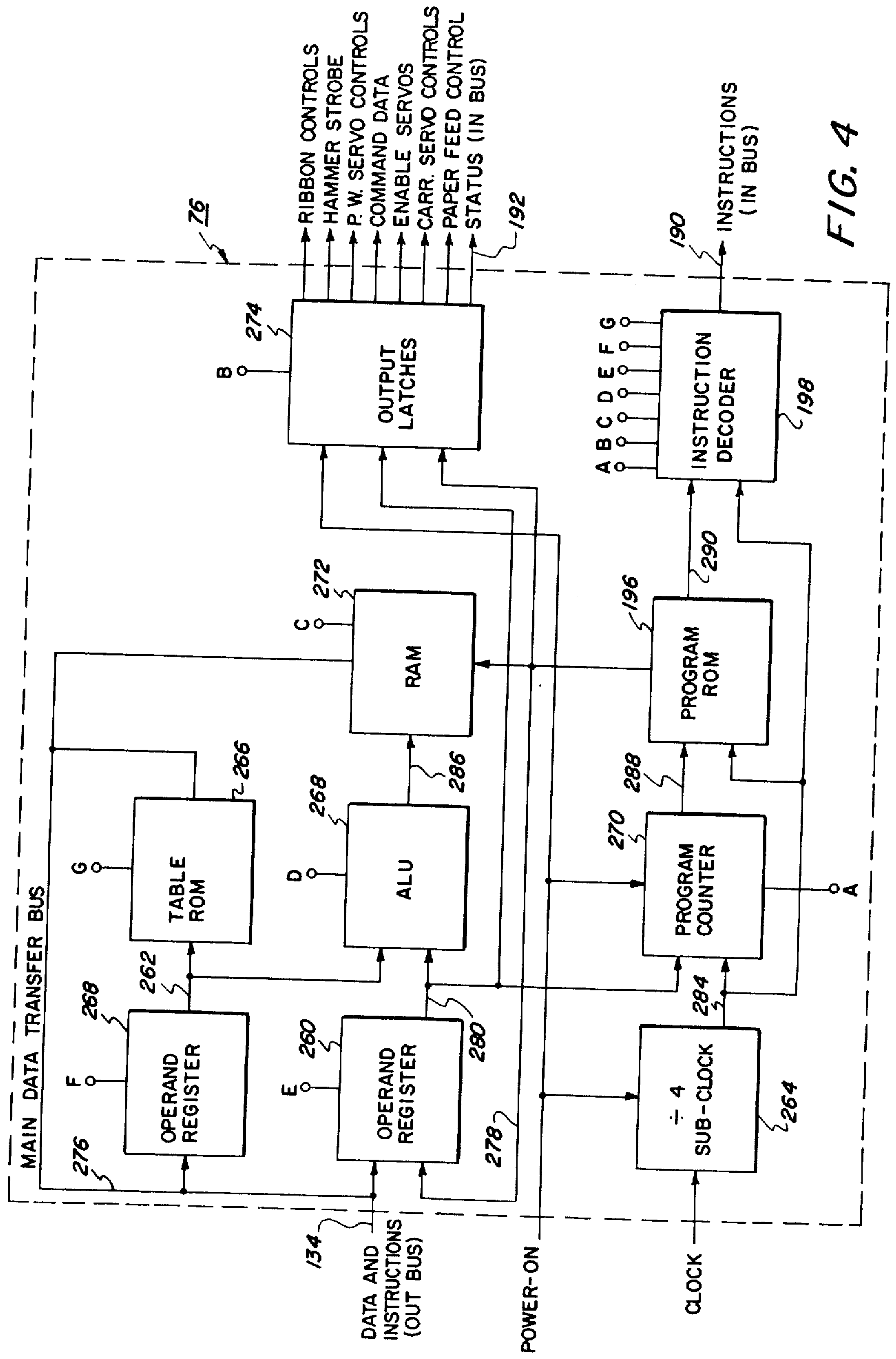
FIG. 4 is a schematic block diagram of the processor depicted in FIG. 2.

Reference is now had to FIG. 4 wherein a preferred processor 76 will be described in more detail. As shown, the processor includes a pair of operand registers 260 and 262, a ÷4 sub-clock circuit 264, a table read-only-memory (ROM) 266, an arithmetic logic unit (ALU) 268, a program counter 270, a random access memory (RAM) 272, the program ROM 196 alluded to previously, a bank of output latches 274, and the instruction decoder 198 also alluded to previously.

The operand register 260 is coupled by the OUT bus 134 to the interface logic 78 for receiving data and instructions placed on such bus. The operand register 260 is also coupled to a main data transfer bus 276 for receiving information placed on such bus from the table ROM 266 and the RAM 272. The operand register 260 is also coupled by a bus 278 to the program ROM 296 for receiving address instructions therefrom. Lastly, the operand register 260 is coupled by a bus E to the instruction decoder 198 for receiving operating instructions therefrom. The output of the operand register 260 is applied along a bus 280 to the ALU 268, the bank of output lataches 274 and to the program counter 270 for reasons which will become apparent below.

The operand register 262, like register 260, is coupled to the OUT bus 134 from the interface logic 78 and to the main data transfer bus 276. It is also coupled by a bus F to the instruction decoder 198 for receiving operating instructions therefrom. The output of the operand register 262 is applied on a bus 282 to the table ROM 266 and to the ALU 268.

The ÷4 sub-clock 264 is included to provide four clock signals on output bus 284, each having a frequency one-quarter that of the CLOCK signal at its input. Desirably, the sub-clock 264 is comprised of a pair of J-K flip-flops (not shown), both of which are reset by a false POWER-ON signal from the power-on monitor circuit 77 (FIG. 2). One of the clock signals from the clock circuit 264 is coupled to the program counter 270 in order to step the counter at the frequency of such clock signal. This clock signal is also applied to the program ROM 196, while the remaining three one-quarter frequency clock signals are applied from the bus 284 to respective inputs of the instruction decoder 198.

The table ROM 266 has an input bus G for receiving operating instructions from the decoder 198 and stores at predetermined address locations the following three types of information:

1. Desired print wheel position data — this data, preferably one byte (8-bits), is addressed by the 7-bit ASCII code for a selected character, as applied to the ROM 266 along the output bus 282 from the register 262.

2. Hammer intensity data — this data is also addressed by the 7-bit ASCII code for a selected character and likewise is desirably one byte.

3. Normalized command velocity data — this data is addressed by a binary word representative of the difference remaining to be traveled by either the print wheel 42 or carriage assembly 44. The binary word address for the print wheel is obtained by the ALU 268 calculating such difference by comparing the actual data stored in the absolute software counter, physically constituted by a register or registers in RAM 272, with the desired position data as received from the table ROM 266 is response to the 7-bit modified ASCII code and stored at another location in RAM 272. With respect to the carriage, the binary word difference address is determined by reading the value stored in the difference software counter, physically constituted by another register or registers in RAM 272.

The ALU 268 is adapted to receive data on the output bus 280 from operand register 260, as well as on the output bus 282 from operand register 262. The ALU is preferably comprised of conventional comparator and adder circuits (not shown). In some instances, the ALU functions merely as a gate for passing data through to the RAM 272 for storage therein, e.g. such as when desired print wheel position data derived from the table ROM 266 is to be stored in RAM 272. However, the ALU 268 also performs certain arithmetic functions, such as calculating the difference between actual and desired print wheel positions once during each internal cycle of the processor. The ALU is adapted to receive operating instructions on a bus D from the instruction decoder 198, which instructions determine and control the specific operation the ALU 268 is to perform at any instant of time. The output of the ALU is applied along a bus 286 to the RAM 272 for the purposes above described.

The program counter 270 is desirably a 9-bit counter which is reset upon application thereto of a false POWER-ON signal and is stepped once after each operation unless a branch operation is to be executed. Thus, the program counter 270 is adapted to receive instructions from the output bus assembler 166 of the interface logic 78 as applied on bus 134, through register 260 and to the program counter on the bus 280, as well as to receive a clock signal from the sub-clock circuit 264. The program counter also receives operating instructions from the intruction decoder 198 along a line A.

The 9-bit output of the counter 270 is applied on an output bus 288 to the program ROM 196. As stated above, the ROM 196 also receives a clock signal from the sub-clock circuit 264 for timing purposes. Now then, the ROM 196 will generate a 16-bit instruction corresponding to the particular address identified by the program counter output, i.e. the program count. Desirably, bit positions 1–3 and 9–12 define the operation code and such bits are coupled along an output bus 290 to the instruction decoder 198. Bit positions 4–8 and 13–16 define address instructions which are forwarded on the bus 278 to the operand register 260, the RAM 272 and the output latches 274. For example, and in accordance with the preferred embodiment, 5 bits are required to address a particular location in RAM 272. These 5 bits are desirably defined by either bits 4–8 or by bits 4 and 13–16, The instruction decoder 198 decodes the operation code defined by bits 1–3 and 9–12 and applies corresponding instructions to the program counter on line A, to the output latches on bus B, to the RAM on the bus C, to the ALU on the bus D, to the operand register 260 on the bus E, to the operand register 262 on the bus F, and to the table ROM 266 on the bus G. Further, the instruction decoder 198 applies appropriate instructions to the interface logic 78 along the IN bus 132 (as constituted by the busses 190 and 192 - FIG. 3).

The output latches 274 receive data from the operand register 260 as applied on bus 280, address instructions from the program ROM 196 as applied on bus 278, and the POWER-ON signal from the power-on monitor circuit 77 (FIG. 2). The following signals are developed by the output latches 274 for application to other portions of the printer:

1. RIBBON LIFT CONTROL
2. RIBBON DRIVE CONTROL
3. HAMMER STROBE
4. P.W. MODE CONTROL
5. P.W. DIRECTION CONTROL
6. P.W. STROBE
7. ENABLE SERVO
8. COMMAND VELOCITY (normalized)
9. HAMMER ENERGY (normalized)
10. CARR. CUSP
11. CARR. STROBE
12. CARR. DIRECTION CONTROL
13. CARR. MODE CONTROL
14. PAPER FEED CONTROL
15. CHECK
16. PRINTER READY The use of a single line in FIG. 4 to denote "ribbon controls" really includes two lines for signals (1) and (2), above. Similarly, the single line denoted "P.W. servo controls" includes four lines for signals (4) - (6), the single line denoted "command data" actually is a bus over which normalized command velocity and hammer energy data are applied in a time-shared, or time multiplexed, manner. The single line denoted "carr. servo controls" includes four lines for the signals (10)–(13), above, while the single line denoted "status" includes two lines for the signals (15) and (16), above. The CARR. CUSP signal (9), not as yet described, will be defined and discussed below. At this point, however, it should be noted that it is applied from the respective output latch 274 under program control to the mode switch 102 (FIG. 2).

It is to be noted that other internal signals, hereinafter referred to as software "flags," are developed by the program for internal use by the processor 76 when carrying out the preferred program. Such program and the nature of the software flags that are developed will be more completely described below.

Although the processor 76, which is desirably a programmed microprocessor, has been described with respect to a presently preferred layout and constitution, it will be appreciated that other suitable and equivalent microprocessors could be employed, with appropriate programming. An example of one such microprocessor is the Intel 8080 microprocessor manufactured by the Intel Corporation of Santa Clara, California. Further circuit details of the preferred microprocessor are disclosed in Appendix A wherein each of the components thereof are readily available from ether Texas Instruments, Inc. of Dallas, Texas or National Semiconductor Corporation of Santa Clara, California.

The operation of the printer 10 will now be described with reference to the flow charts of FIGS. 11 - 24 in conjunction with FIGS. 1 - 4. With the application of power to the printer 10, the power monitor circuit 77 generates a false POWER ON signal which is applied to the processor 76 for resetting all counters, registers and flip-flops therein. Thus, the false POWER ON signal directly resets the program counter 270 and flip-flops defining the output latches 274. Simultaneously with this resetting operation, the main system clock 176 starts up and stabilizes.

As soon as the power monitor circuit 77 senses its monitored voltages at their proper levels, it produces a true POWER ON signal which enables the sub-clock 264 and starts the program running from program count 0000.

Figure 11:
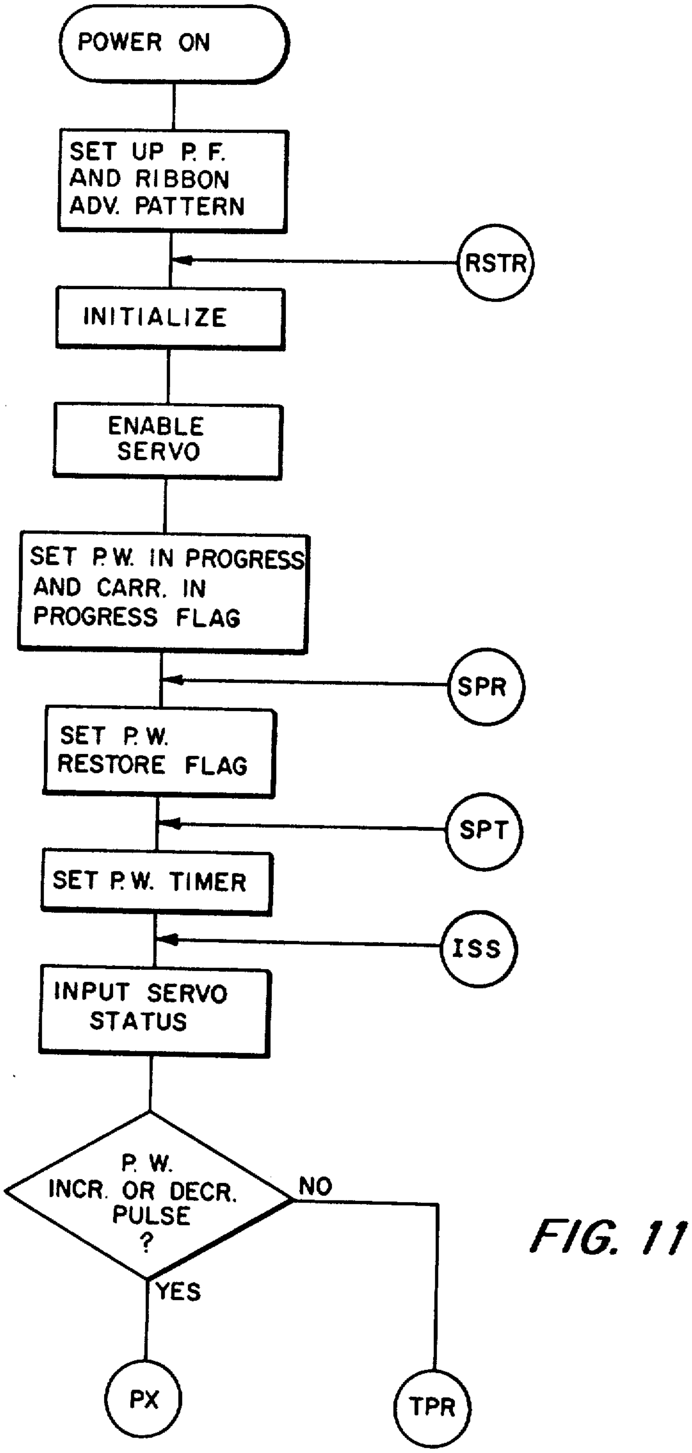
FIGS. 11 - 24 are flow charts depicting the sequence of operations carried out by the printer of FIGS. 1 and 2.
Figure 12:
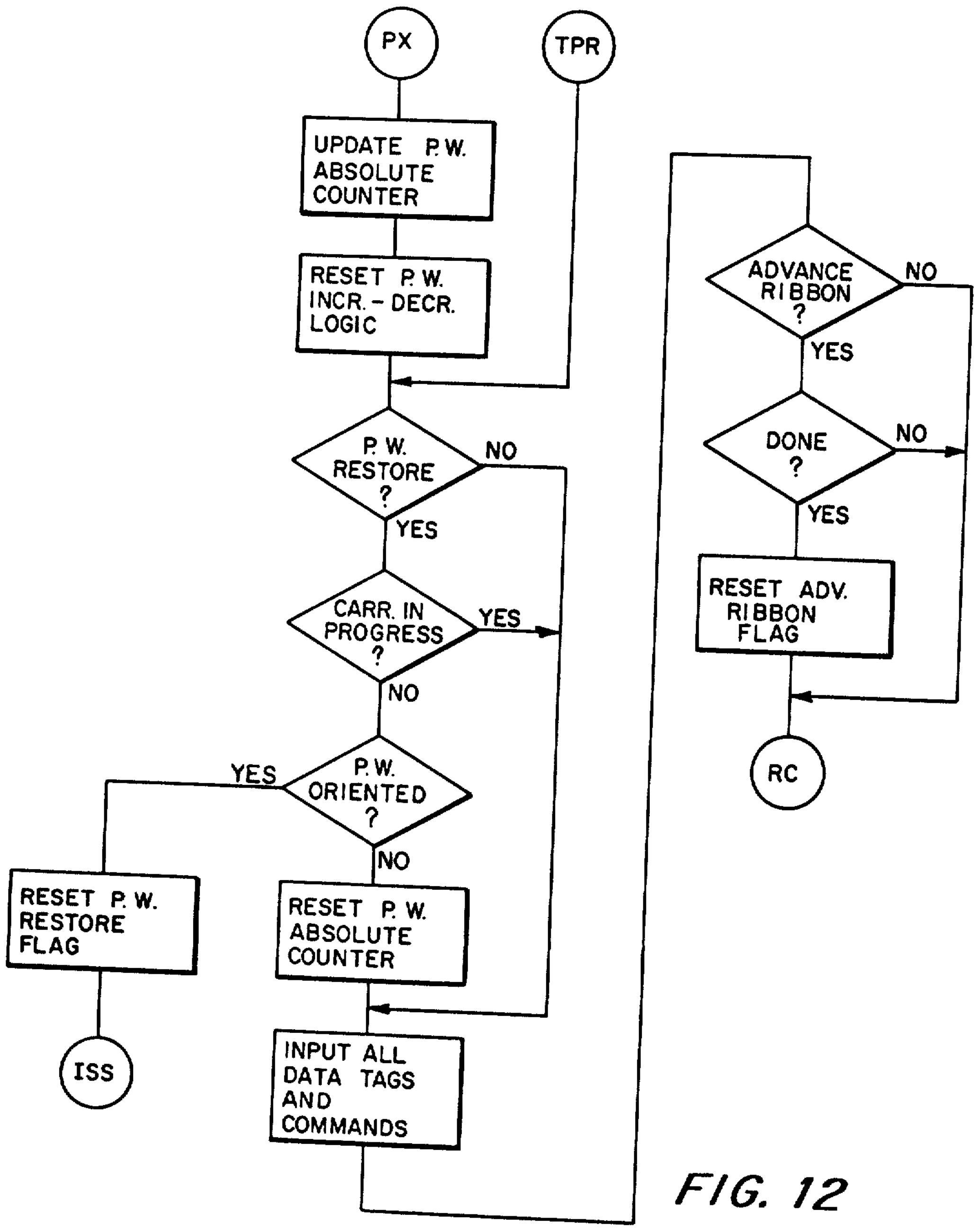

Referring now specifically to FIG. 11, following a true POWER ON signal, the paper feed and ribbon advance waveform pattern is set up in binary form and stored at a predetermined address location in RAM 272. As is conventional, the pattern, is selectively shifted in a recirculation manner and is detected to generate stepping pulses for stepping the paper feed motor in drive 116 (FIG. 2) and the ribbon feed motor in drive 112 (FIG. 2). As this technique is conventional and well known, it will not be further described herein.

After the paper feed and ribbon advance pattern is set up, a restore or initialization routine is commenced by the instruction decoder 198 causing all data tag latches 152 to be reset, as well as the CHECK and HAMMER STROBE output latches 274. Additionally, it causes the PRINTER READY output latch to be set. Control of these output latches 274 is effected via operating instructions on bus B whereas resetting of the data tag latches 152 is effected successively in time by RESET commands from the decode logic 154 (FIG. 3) in response to a reset instruction on bus 190 from the instruction decoder 198.

In the next operation, the ENABLE SERVO output latch is set, thereby supplying an ENABLE SERVO signal to the print wheel drive 66 and the carriage assembly drive 104 in order to enable same to respectively respond to the outputs of the summing networks 80 and 106 to respectively control rotation of the print wheel 42 and linear movement of the carriage assembly 44. It will be noted that the print wheel and carriage servos are enabled at this time in order to effect an initialization of the print wheel and carriage, i.e. movement of both to their home positions in the manner alluded to earlier and to be described in more detail below. Further, it should be noted that the print wheel and carriage servos are enabled only when it is necessary to move the print wheel carriage and platen assembly, or if the print wheel and/or carriage are being moved manually. In other words, every time a desired character element has been impacted by the hammer and there is no motion pending, the servos will be disabled, thereby conserving power and reducing servo motor noise.

After the servos are enabled, "print wheel-in-progress" (PIP) and "carriage-in-progress" (CIP) software flags are set in the processor. These flags represent the fact of actual or impending motion of the print wheel and carriage assembly, respectively, and are periodically interrogated by the processor, as will become clear below. In addition to and following the setting of the above flags, a "print wheel restore" flag is set in the processor. This latter flag is indicative of an actual or impending restore print wheel operation. As will be realized, a restore operation involves initialization of the print wheel and carriage by return thereof to home positions. A restore operation can be operator initiated, as by the host controller 124 generating a RESTORE command, or generated internally for reasons to be discussed below.

The next operation is to set the print wheel software timer, which is defined by an appropriate register in RAM 272. When the timer thereafter starts, it begins counting and continues to count for 30ms or until a P.W. INCR. or P.W. DECR. pulse is received by the processor from the increment-decrement logic 184 of the interface logic 78. In this regard, and after the timer is set, all servo status signals are forwarded from the output bus assembler 166 of the interface logic 78 to the operand registers 260 and 262. As will be recalled, these signals include synchronized P.W. EVEN, P.W. HOME, CARR. EVEN and CARR. HOME signals and are applied along the bus 180 from the sync. circuit 172. From the operand registers 260 and 262, the servo status signals are applied through the ALU 268 for storage at predetermined address locations in RAM 272.

Thereafter, the processor 76 inquires as to whether a P.W. INCR. or P.W. DECR. pulse has occurred during the 30ms timing period. If the answer is yes, the print wheel absolute software counter, defined by a register in RAM 272 and keeping track of the actual position of the print wheel, is updated by incrementing or decrementing by one, as the case may be. After the absolute counter is updated, the print wheel portion of the increment-decrement logic 184 is reset and print wheel timer is set. Following this operation, the processor inquires as to whether a restore print wheel operation is being or about to be carried out, as evidenced by the print wheel restore flag being set. If the answer to the question of whether a P.W. INCR. or P.W. DECR. pulse has occurred is no, the update counter and reset increment-decrement logic operations are by-passed with the next step being the restore question above posed.

If the print wheel restore flag was set, i.e. a restore operation is being or is about to be carried out, then the processor 76 inquires as to whether the CIP flag is set, i.e. the carriage assembly is being or is about to be moved. If the answer is no, the next question posed is whether the print wheel is "oriented." By oriented, it is meant that three P.W. HOME pulses have occurred since the restore operation commenced and a true (low level) P.W. EVEN signal occurred concurrently with the third P.W. HOME pulse. During a restore, or initialization, operation, the print wheel is rotated to a home position by rotating it past the home detector 82 three times at a constant velocity and at the third time, if the print wheel is oriented, starting to decelerate at a predetermined rate to reach the home position. In accordance with this constant velocity of rotation during initialization, the print wheel takes 30 counts to stop once commanded to stop, the home position being 15 character positions clockwise of the P.W. HOME detection. Since every zero-crossing of the P.W. POSITION 1 signal results in the generation of a P.W. INCR. or P.W. DECR. pulse, while there are two zero-crossings per character space increment, it is apparent that in order to reach the home position at count 30 (an even count), the detection of the P.W. HOME pulse must concur with a true (low level) P.W. EVEN signal. When the third P.W. HOME signal occurs coincident with a true P.W. EVEN signal, the print wheel is properly oriented.

If the print wheel is properly oriented, the print wheel restore flag is reset and the program branches back to the input servo status operation in FIG. 11. If the print wheel is not properly oriented, such as when only the first or second P.W. HOME pulse has been detected or when the third P.W. HOME pulse occurs coincident with a false (high level) P.W. EVEN signal, then the print wheel absolute software counter is reset in order for the operation to be repeated, i.e. the fourth P.W. HOME pulse compared with the P.W. EVEN signal. If the desired condition is still not met, then the operation is constantly repeated until it is met or, if not, the operator disables the printer upon seeing the continuously rotating print wheel. Such continuous rotation is indicative of a possible misalignment of the home detector and/or of some other error in the circuitry, etc.

After the absolute counter is reset, assuming the print wheel restore and carriage in progress flags were respectively set and not set, or after checking the print wheel restore flag if it was not set, or after checking the carriage in progress flag if it was set, all of the instructions loaded into the output bus assembler 170, except the increment-decrement signals, are transferred along the busses 170 and 134 to the operand registers 260 and 262. These instructions, to the extent they are present, include DAT TAG signals, priority signals (PBH, PBV), and RESTORE and RIBBON LIFT signals. These instructions are outputted from the assembler 166 in response to an ENABLE command from the decode logic 154.

When this operation has been completed, the processor inquires as to whether the ribbon should be advanced. This is determined by looking at the ribbon advance software flag, i.e. if it is set, then the ribbon should be advanced. If the ribbon is to be advanced, the processor next inquires as to whether the ribbon has already been advanced. If yes, the advance ribbon flag is reset. If no, or if the ribbon was not to be advanced in the first instance, then the reset operation just described is by-passed.

Figure 13:
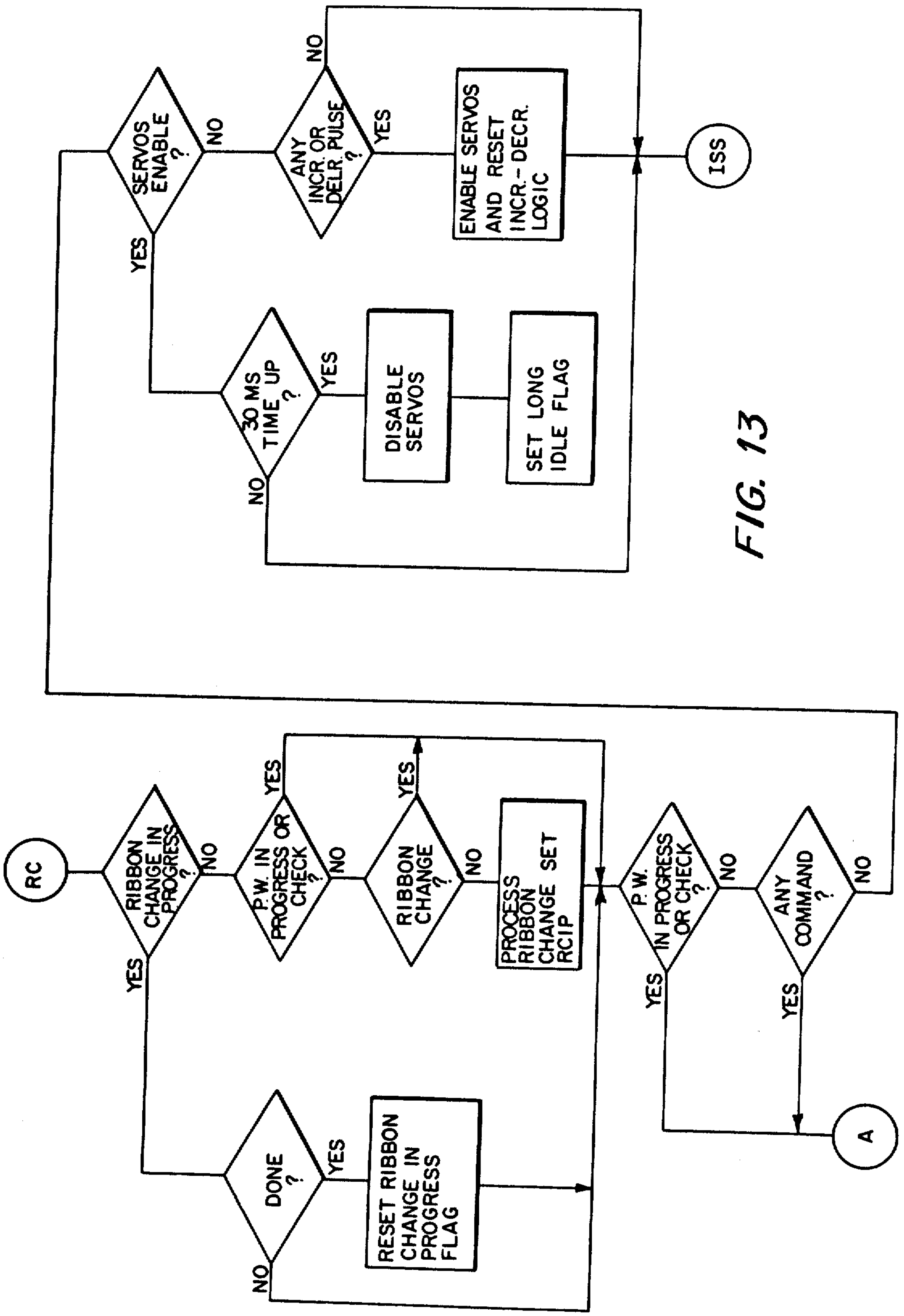

Referring now to FIG. 13, and in accordance with the next step of the program, the processor inquires as to whether a ribbon change in progress flag has been set, i.e. is a ribbon change occurring or about to occur. By ribbon change it is meant a lifting of the ribbon if at its low position or a lowering of the ribbon if at its upper position. If the answer is no, the processor inquires whether the PIP flag is set or a CHECK signal is present, i.e. the CHECK latch is set. If neither is true, the next inquiry is as to whether the ribbon has already been changed to the desired position. If no, the desired ribbon change is then effectuated and the ribbon change in progress flag is set. Then, when the processor next inquires as to whether the ribbon change in progress flag is set, the yes answer will lead to a next inquiry as to whether the change has been completed. If yes, the ribbon change in progress flag is reset. If no, or if the above question of whether the PIP flag or CHECK latch is set is yes, or if the answer to the question whether the ribbon change has already been effected is yes, then the program again asks whether the PIP flag CHECK latch is set.

If the answer to the last question is yes, the program branches to the routine depicted in FIG. 14 and to be discussed below. If the answer is no, the processor next inquires as to whether any DATA TAG signal or input command signal has been received. If yes, the program branches to the routine in FIG. 14. If no, the processor asks whether the servos are enabled. If no, the next question is whether any increment or decrement pulse has occurred. If yes, the servos are enabled by raising the SERVO ENABLE signal and the increment-decrement logic 184 is reset by a RESET command from the decode logic 154 in response to instructions from the processor on bus 190. If the answer to whether the servos are enabled was yes, then the processor asks whether the 30ms timer has expired, it being recalled that an increment or decrement pulse must occur within that period or the servos will be disabled. Accordingly, if 30ms has expired since the timer was set, the servos are disabled and a long idle flag is set. If the 30ms time period has not yet expired, of if the above question of whether any increment or decrement pulse has occurred is answered in the negative, or after the servos are enabled and increment-decrement logic 184 is reset if the latter question is answered in the positive, the program returns to input servo status operation of FIG. 11.

Figure 14:
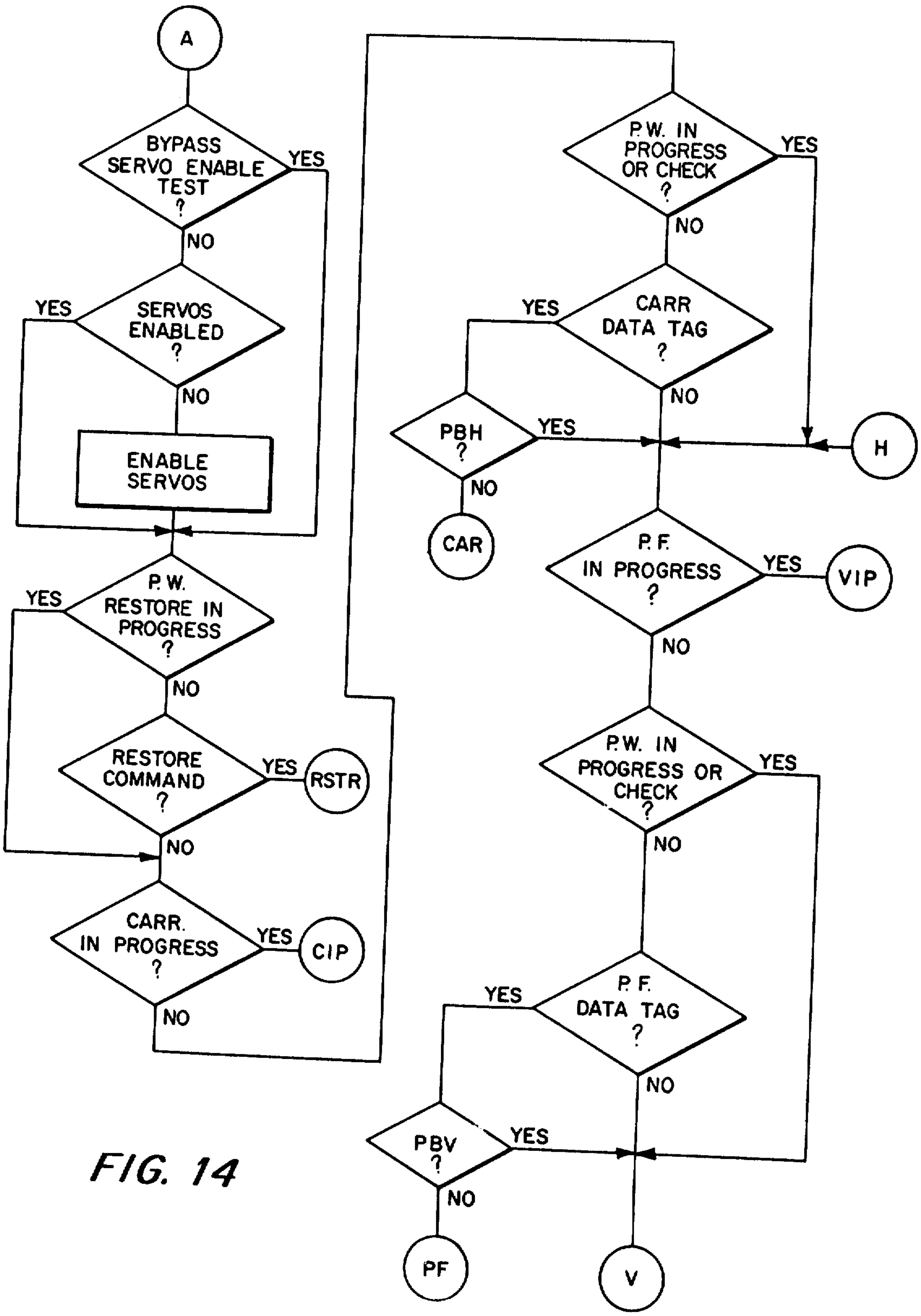

Referring now to the routine depicted in FIG. 14, the processor inquires as to whether it should bypass testing for a CHECK or servo enabled condition. A by-pass would be effected in the case where the servos are purposely disabled during a carriage restore operation or after a CHECK condition is detected. If the answer is no, the processor inquires as to whether the servos are enabled. If no, the servos are enabled. If a by-pass is to be effected or if the servos are already enabled, the processor next inquires as to whether the print wheel restore in progress flag is set. If no, the next inquiry is whether a RESTORE command has been received. If yes, the program returns to the restore routine in FIG. 11. If no, or if the print wheel restore in progress flag was set, the processor inquires as to whether the CIP flag is set. If yes, the program branches to a CIP routine depicted in FIG. 21 and to be described below.

If the carriage in progress flag was not set, the next inquiry is whether the PIP flag or CHECK latch is set. If no, the processor asks whether a CARR. DATA TAG signal has been received. If yes, the processor asks whether a PBH (space-after-print sequence) signal has been received. If no, the program branches to a carriage routine depicted in FIG. 21. If yes, or if no CARR. DATA TAG signal was received or if the PIP flag or CHECK latch was set, then the processor asks whether the paper feed in progress flag is set. If yes, the program branches to a paper feed in progress routine to be described below in connection with FIG. 24.

If the paper feed in progress flag is not-set, the processor next inquires as to whether the PIP flag or CHECK latch is set. If no, the next inquiry is whether any P.F. DATA TAG signal has been received. If yes, the processor asks whether a PBV (paper feed-after-print sequence) signal is present. If no, the processor branches to a paper feed routine in FIG. 24. If yes, or if no P.F. DATA TAG signal was received or if the PIP flag or CHECK latch was set, the processor executes the routine depicted in FIG. 15.

Figure 15:
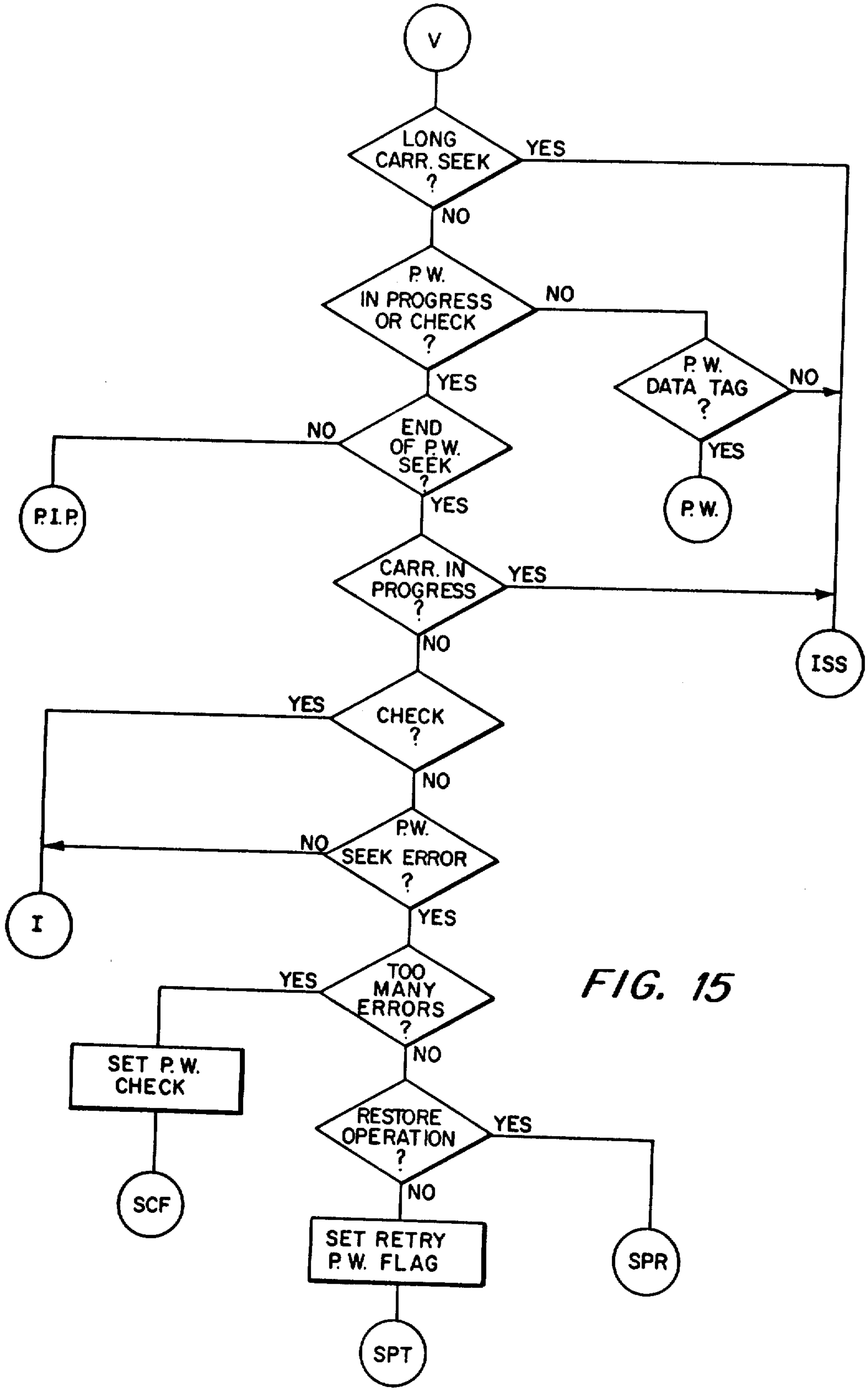

Referring now to the routine in FIG. 15, the processor inquires as to whether a "long carriage seek" flag is set. This flag will be set whenever the present carriage position is more than 127, 1/120th inch increments away from the desired carriage position. If the answer is yes, the program returns to the input servo status routine in FIG. 11. If no, the next inquiry is whether the PIP flag or CHECK latch is set. If no, the processor inquires whether a P.W. DATA TAG has been received. If no, the program branches to the input servo status routine of FIG. 11. If yes, the program branches to a print wheel routine to be described below in connection with FIG. 18.

If the PIP flag or CHECK latch was set, the processor inquires as to whether the print wheel has reached its desired stopping position. If no, the program branches to a PIP routine to be described below in connection with FIG. 19. If yes, the next inquiry is whether the CIP flag is set. If yes, the program branches to the input servo status routine in FIG. 11. If no, the processor asks whether the CHECK signal is present, i.e. CHECK latch set. If yes, the processor branches to the routine depicted in FIG. 16. If no, the next question is whether there is a print wheel seek error. A print wheel seek error is detected when, at the instant a count of one is registered in the print wheel software difference counter, i.e. one-half character space away, the P.W. EVEN signal is true (low level). A true P.W. EVEN signal is indicative of an even condition, which is not the case at a count of one (an odd count). When a print wheel seek error occurs, whether during deceleration of the print wheel to its home position in an initialization procedure, or during deceleration to a desired (commanded) stopping position for printing, the program will effect a retry of the positioning operation. In the case of a command positioning operation, the retry process will commence with the initialization procedure before retrying to position the print wheel at the desired (commanded) stopping position for printing. This operation of the printer 10 will become more apparent below in connection with the continued description of FIG. 15.

Figure 16:
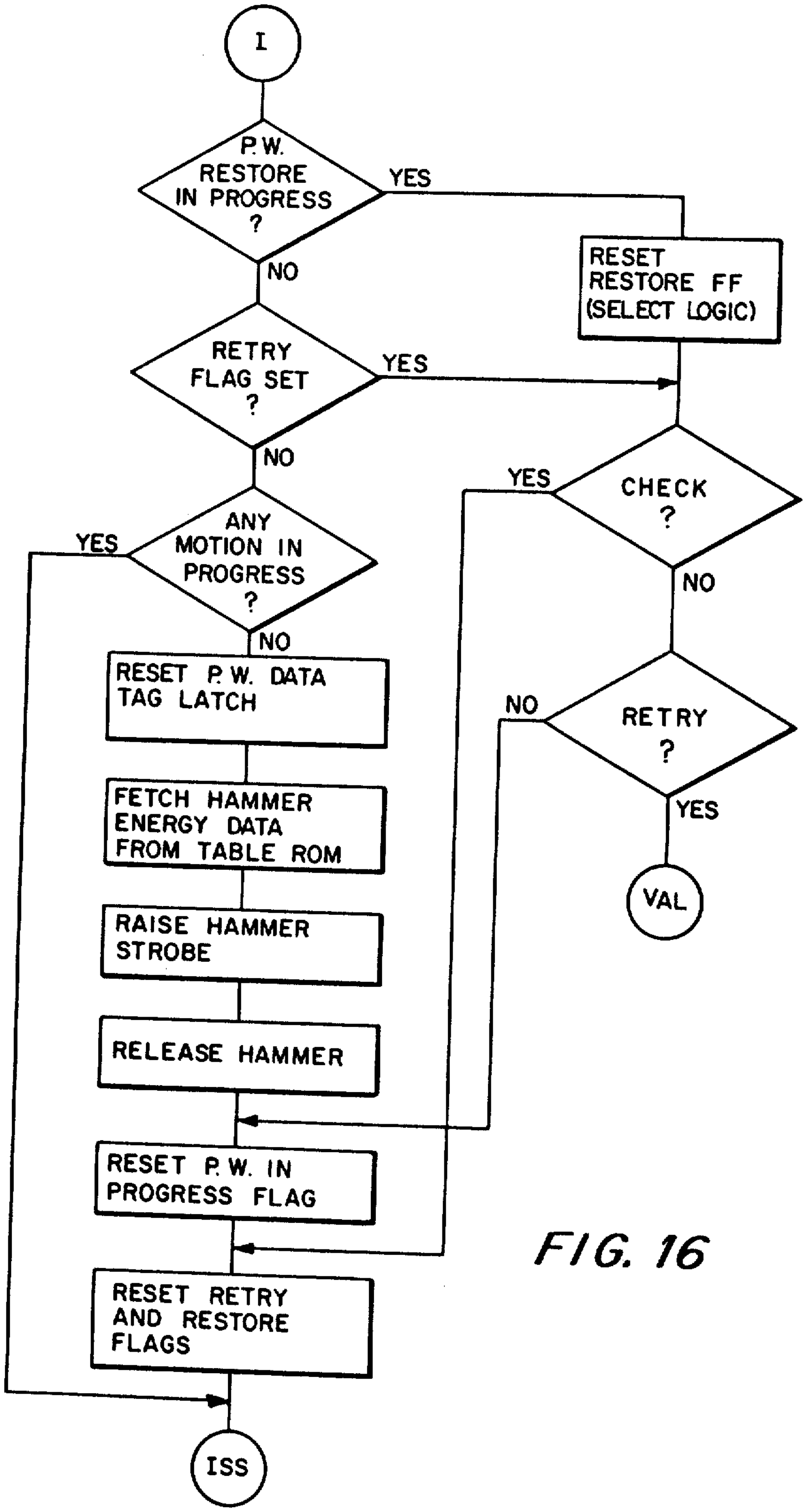

Now then, if no print wheel seek error has occurred, the program branches to the routine in FIG. 16, whereas if a seek error has occurred, the processor asks whether too many errors have occurred, i.e. has the positioning procedure, whether initialization or command, been repeated a predetermined number of times, e.g. eight times, in response to such predetermined number of seek errors. If too many seek errors have occurred, the processor sets the CHECK latch and branches to the routine depicted in FIG. 17 and to be described below. If less than eight errors have occurred, the processor asks whether a restore operation is in progress, as by detecting whether the print wheel restore in progress flag is set. If yes, the program returns to the routine in FIG. 11 starting with setting the print wheel flag. If no, a retry print wheel flag is set followed by the processor returning to the routine in FIG. 11 commencing with setting the print wheel timer.

Referring now to the routine depicted in FIG. 16, the processor asks whether the print wheel restore in progress flag is set. If yes, the RESTORE latch in the selection logic 136 (FIG. 3) is reset. If no, the processor asks whether a retry is in progress, i.e. whether the retry in progress flag is set. If yes, or after the RESTORE latch is reset in the event a print wheel restore is in progress, the processor asks whether a CHECK condition is present. If yes, the retry and restore flags are reset and the program returns to the input servo status routine in FIG. 11. If no CHECK condition is present, the processor again inquires whether or not a retry flag is set. If the answer is still yes, the program branches to a part of the print wheel routine shown in FIG. 18 and commencing with fetching desired print wheel position data from the table ROM 266. If the answer to the latter question is no, the processor first resets the PIP flag, then resets the print wheel retry and restore flags, and then returns to the input servo status routine in FIG. 11.

If the initial retry flag set question was answered in the negative, the processor inquires as to whether any motion is in progress, i.e. are any of the ribbon change, ribbon advance, carriage or paper feed in progress flags set. If yes, the program branches back to the input servo status routine in FIG. 11. If no, it means that the print wheel has reached its desired position and the carriage and paper feed assemblies are at rest. Thus, the hammer assembly 60 may be actuated. To this end, the processor fetches normalized hammer energy data from the table ROM 266 which is applied through D/A converter 88 and intensity selection switch 122 to derive the HAMMER ENERGY signal representing the desired level of force with which the selected character element is to be struck. This HAMMER ENERGY signal is applied from the circuit 122 to the hammer control circuit 120. The next step after fetching the hammer energy data, the processor raises the HAMMER STROBE to load the HAMMER ENERGY signal into the hammer control circuit 120 thereby actuating the hammer assembly 60 with the requisite amount of impact energy for the selected character element to be struck.

After the hammer assembly has been actuated for the requisite period of time, the processor inactivates it, resets the P.W. DATA TAG latch, and then resets the PIP, retry and restore flags, followed by branching back to the input servo status routine in FIG. 11.

Figure 17:
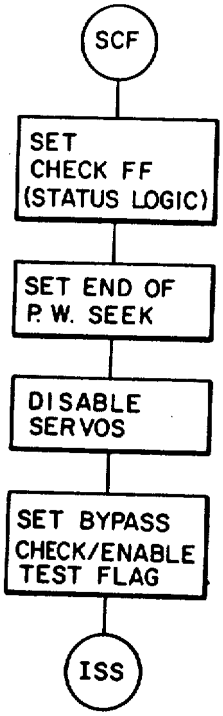

Referring now to FIG. 17 in conjunction with FIG. 15, if too many print wheel servo errors are detected, the print wheel CHECK latch in the processor is set, followed by setting the CHECK latch in the status logic 142 (FIG. 3). Thereafter, the end of print wheel seek flag is set followed by disabling of the print wheel and carriage servos. This is then followed by setting the bypass SERVO ENABLE test flag (see FIG. 14) and then branching to the input servo status routine in FIG. 11.

Figure 20:
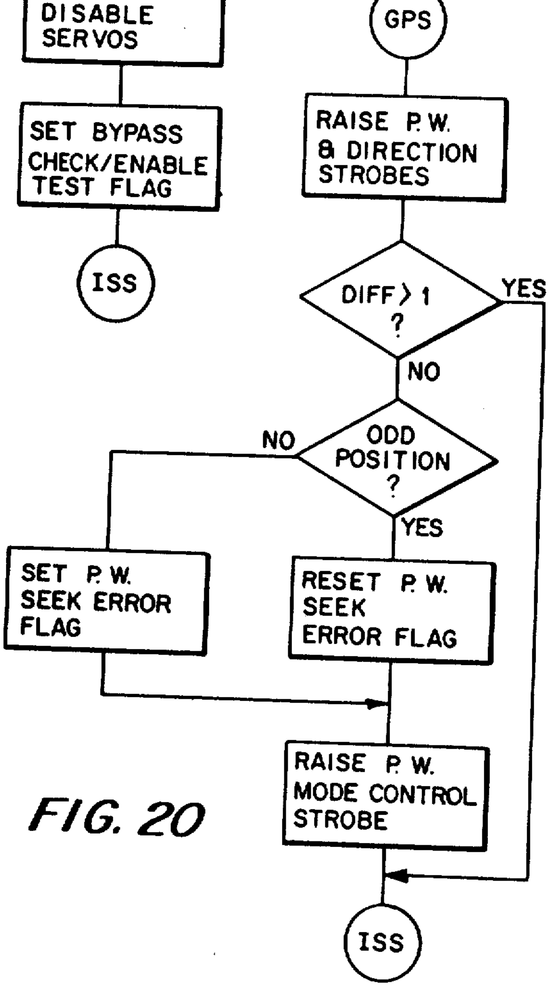
Figure 18:
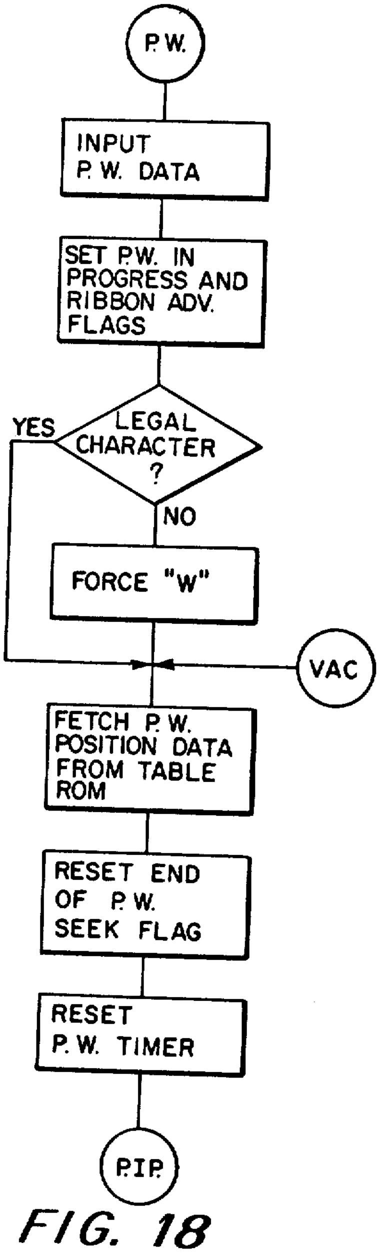

The print wheel routine will now be described with reference to FIGS. 18 - 20. At the start of this routine, all print wheel input data is loaded into the processor's operand register 262 from the output bus assembler 166 of the interface logic 78. This data, as will be recalled, is a modified 7-bit ASCII code defining a desired character to be struck. After this operation, the processor sets the PIP and ribbon advance flags and then asks the question whether the input data defines a legal character, i.e. has the correct ASCII code been used. If no, the ASCII code corresponding to a small *w* is used. If yes, the ASCII coded character is fed as an address to the table ROM 266 which then supplies the P.W. DESIRED POSITION signal (a multi-bit signal) onto the main data transfer bus 276 (FIG. 4) for application through operand registers 260 and 262 and the ALU 268 for storage in RAM 272 for a purpose to be described below. The next step in the operation is to reset the end of print wheel seek flag and reset the print wheel software timer.

Figure 19:
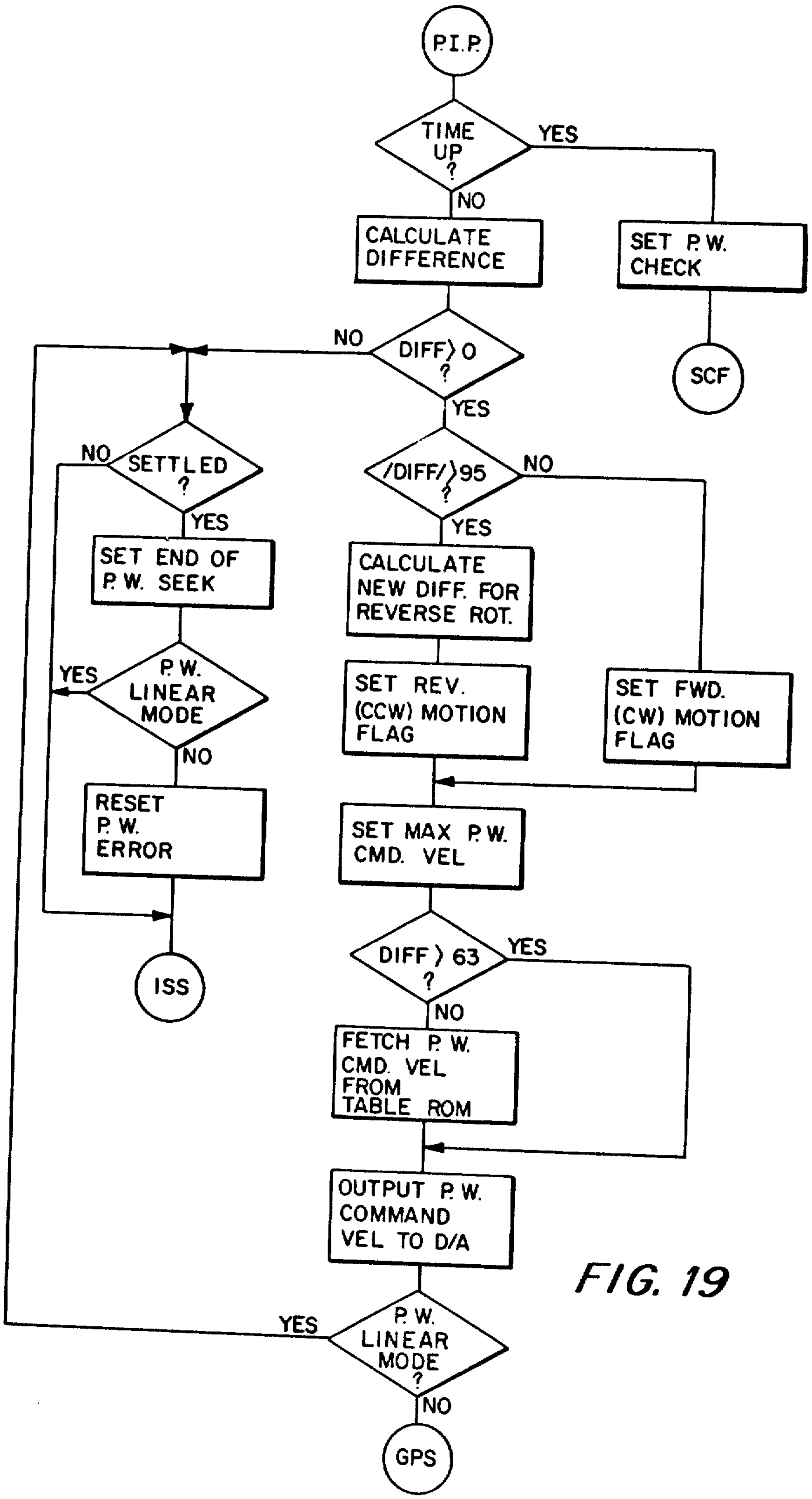

As shown in FIG. 19, the processor then asks whether the print wheel timer has expired, i.e. is the 30ms time up without the occurrence of a P.W. INCR. or P.W. DECR. pulse being received. If the answer is yes, the processor sets the print wheel CHECK latch and branches to the routine of FIG. 17. If no, the processor causes the ALU 268 to calculate the difference between the P.W. DESIRED POSITION data, as applied to the ALU 268 from the RAM 272 along the main data transfer bus 276 through the operand register 260 and 262, and the P.W. ACTUAL POSITION data, as applied to the ALU from the absolute software counter in RAM 272 also along the main data transfer bus 276 and through registers 260 and 262. The operation of forwarding the actual and desired position data from RAM 272 may be deemed to be included in the block labelled "calculate difference" in FIG. 19. Such calculation occurs once during each internal processing cycle of the processor.

After ALU 268 calculates the difference, the processor inquires as to whether the difference is greater than zero. If no, meaning the difference equals zero, the processor asks whether the print wheel has "settled", i.e. come to a stopped position. If no, the program branches to the input servo status routine in FIG. 11. If yes, the processor sets the end of print wheel seek flag and then asks whether the P.W. MODE CONTROL signal is true, meaning that the print wheel servo is operating in the position mode. If yes, the program branches to the input servo status routine, if no, the print wheel seek error flag is reset and then the program returns to the input servo status routine in FIG. 11.

If the answer to the question whether the difference between P.W. DESIRED POSITION and P.W. ACTUAL POSITION is greater than zero is yes, then the processor inquires whether the absolute value of the difference is greater than 95. This operation is carried out in the ALU and is necessary to determine the direction of rotation of the print wheel 42, it being recalled that the arc of rotation is always the smallest, i.e. less than or equal to 180°. An absolute difference of 95 is selected since there will be two increment or decrement pulses occurring for each character space movement, since such pulses are generated at the zero-crossings of the P.W. POSITION 1 signal and there are preferably 96 characters on the print wheel 42. Thus, if the absolute difference is 96 or greater, reverse rotation is warranted.

In the event the absolute difference is greater than 95, the processor causes the ALU 268 to calculate a new difference for reverse rotation. After this operation, the processor sets a reverse motion flag and then sets a maximum print wheel command velocity flag. If the absolute difference originally calculated for forward motion is not greater than 95, then a forward motion flag is set followed by setting the maximum print wheel command velocity flag.

The processor next inquires whether the calculated difference is greater than 63, such inquiry being conducted in the ALU 268 by suitable comparison circuits. If the answer is yes, it means the maximum P.W. COMMAND VELOCITY signal should be applied through the mode switch 74 to the summer 80 (FIG. 2). Consequently, a normalized maximum P.W. COMMAND VELOCITY signal will be applied from the command velocity output latches 274 through the D/A converter 88 to the S/H and smoothing circuit 90 where it will be strobed therein at the appropriate time under program control as will be discussed below. As indicated previously, the circuit 90 includes means for multiplying the normalized maximum P.W. COMMAND VELOCITY signal by a constant representative of the unique motion characteristic of the print wheel 42 in order to define the maximum P.W. COMMAND VELOCITY signal.

If the calculated difference was not greater than 63, the processor causes such calculated difference to be applied as an address to the table ROM 266. The calculated difference is forwarded to the ROM 266 from the RAM 272 along the main data transfer bus 276, through the operand register 262 and along the bus 282. The corresponding normalized P.W. COMMAND VELOCITY for the difference remaining to be traveled is then applied from the ROM 266 along the main data transfer bus 276, through the operand register 260 and along the bus 280 to the velocity command data output latches 274.

After the desired command velocity signal is applied to the D/A converter 88, the processor inquires whether the print wheel servo in a position mode. If yes, the processor asks whether the print wheel has settled. If it hasn't settled, the program branches to an input servo status routine. If it has settled, the end of print wheel seek flag is set and the processor again asks whether the print wheel servo is in the position mode. If yes, the program branches to the input servo status routine and, if no, the print wheel timer is reset and then a branch to the input servo status routine is made.

If, when the processor asks whether the print wheel servo is in a position mode following application of the command velocity data to the D/A converter 88, the answer is yes, then the P.W. STROBE and DIRECTION STROBE signals are raised, as shown in FIG. 20.

Following this, the processor inquires as to whether the calculated difference is greater than one. If the answer is yes, the program branches back to the input servo status routine in FIG. 11. If the answer is no, then the next question is whether the P.W. EVEN signal is false, which must be the case with a difference of one, i.e. an odd difference. If the P.W. EVEN signal is true, the processor sets the print wheel seek error flag, whereas if the P.W. EVEN signal is false, the desired condition, then the print wheel seek error flag is reset. In either event, the P.W. MODE CONTROL signal is thereafter raised in order to switch the print wheel servo into the position mode by allowing mode switch 74 to gate only the P.W. POSITION 1 signal through to the summer 80. Following raising the P.W. MODE CONTROL signal, the program executes the input servo status routine in FIG. 11.

It must be noted that the controlled deceleration of the print wheel in the manner above-described, i.e. by dual-mode servo control, is applicable during initialization as well as during command positioning. Thus, during initialization, the desired stopping position, i.e. home position, will be at count 30 of the absolute software counter. The processor will then inquire as to whether a seek error exists at count 29, i.e. one count away from the home position.

Figure 21:
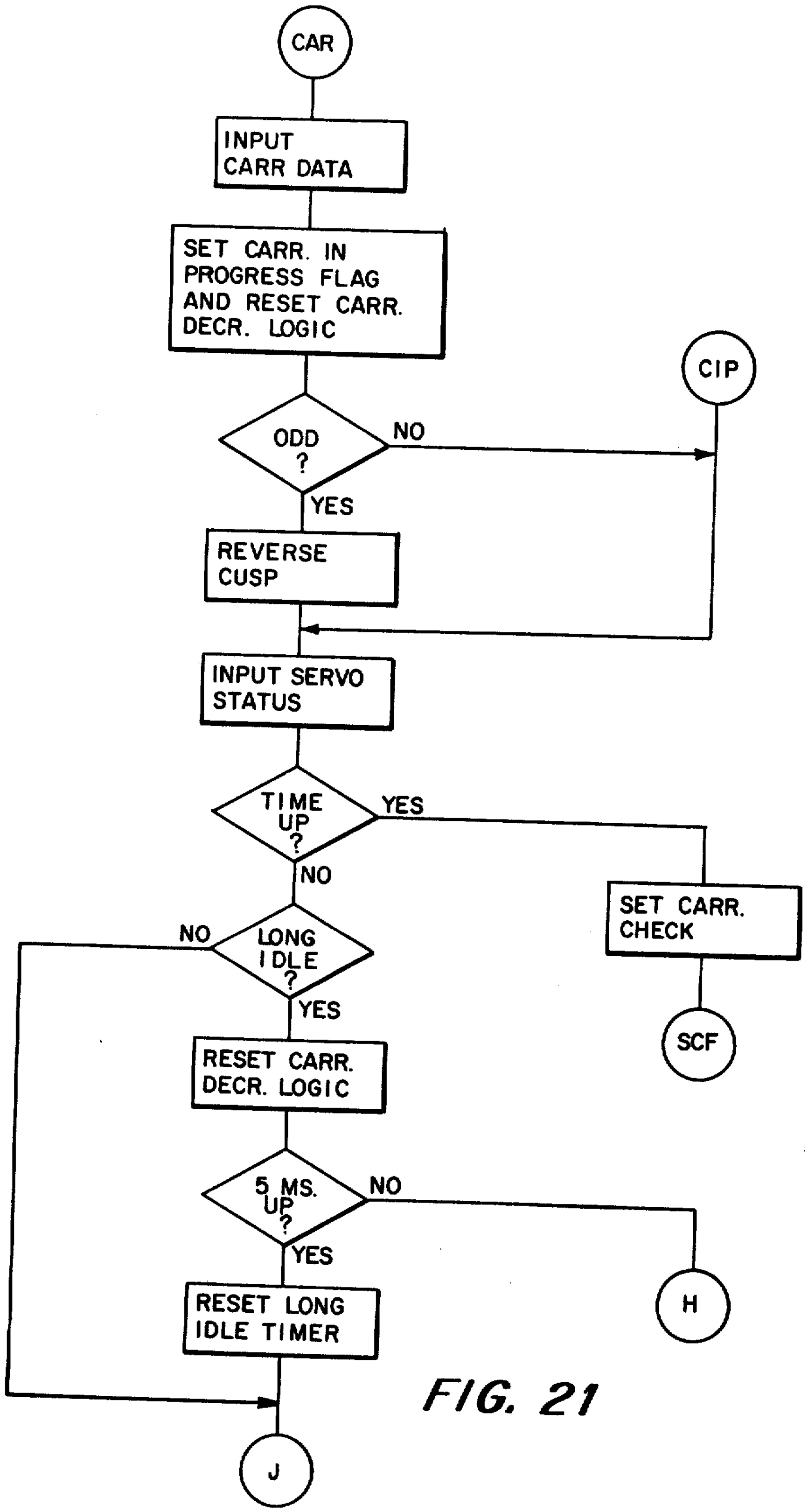

The carriage routine will now be described with reference to FIGS. 21 - 23. The operation is to load all carriage input data from the data register 196 into the operand registers 260 and 262 along the bus 134. This data, representative of the distance to be traveled from actual to desired positions, is forwarded from the registers 260 and 262 through the ALU 268 and stored at a predetermined address location in RAM 272, previously referred to as the carriage difference software counter. Following this operation, the processor sets the CIP flag and resets the carriage portion of the increment-decrement logic 184. Following this, the processor inquires as to whether the carriage position data just inputted is odd or even, i.e. whether the least significant bit is 1 or 0. If the least significant (12th) bit is a binary 0, it means that the signal is odd and that the total carriage movement will be an odd multiple of 1/120th, whereas if the signal is a binary 1, it means that the signal is even and that the total carriage will be an even multiple of 1/120th, i.e. a multiple of 1/60.

If the carrier position data is odd, the CARR. POSITION 1 signal is inverted at the time it is gated through the mode switch 102 by a true CARR. MODE CONTROL signal. Inverting or "reversal" of the CARR. POSITION 1 signal hereinafter referred to as a "cusp" reversal operation, is effected by applying a true CARR. CUSP signal to the mode switch 102. The reason it is necessary to reverse cusp with an odd carriage data signal is that, due to the odd-multiple of 1/120 inch movement, the portion of the CARR. POSITION 1 signal that would ordinarily be gated through the switch 102 in a carriage position mode would have an inclined forward slope, instead of the requisite declined forward slope.

If the carriage position data is even, the processor inputs the servo status signals referred to above, whereas if this data is odd, the servo status signals will be inputted into the processor after the reverse cusp operation has been completed. The processor then asks whether the carriage timer has expired, i.e. whether the 30ms time period is up without a CARR. DECR. pulse having occurred. If yes, the carriage CHECK latch is set and the program branches to the routine in FIG. 17. If the time has not expired, the processor inquires as to whether the long idle flag has been set. If yes, the processor resets the carriage portion of increment-decrement logic 184 and then asks whether a 5ms timer has expired. If 5ms has not expired, the program branches back to that portion of the routine in FIG. 14 asking whether a paper feed in progress flag is set. If the 5ms time period has expired, the long idle timer is reset and the program continues with the carriage routine, as shown in FIG. 22.

Figure 22:
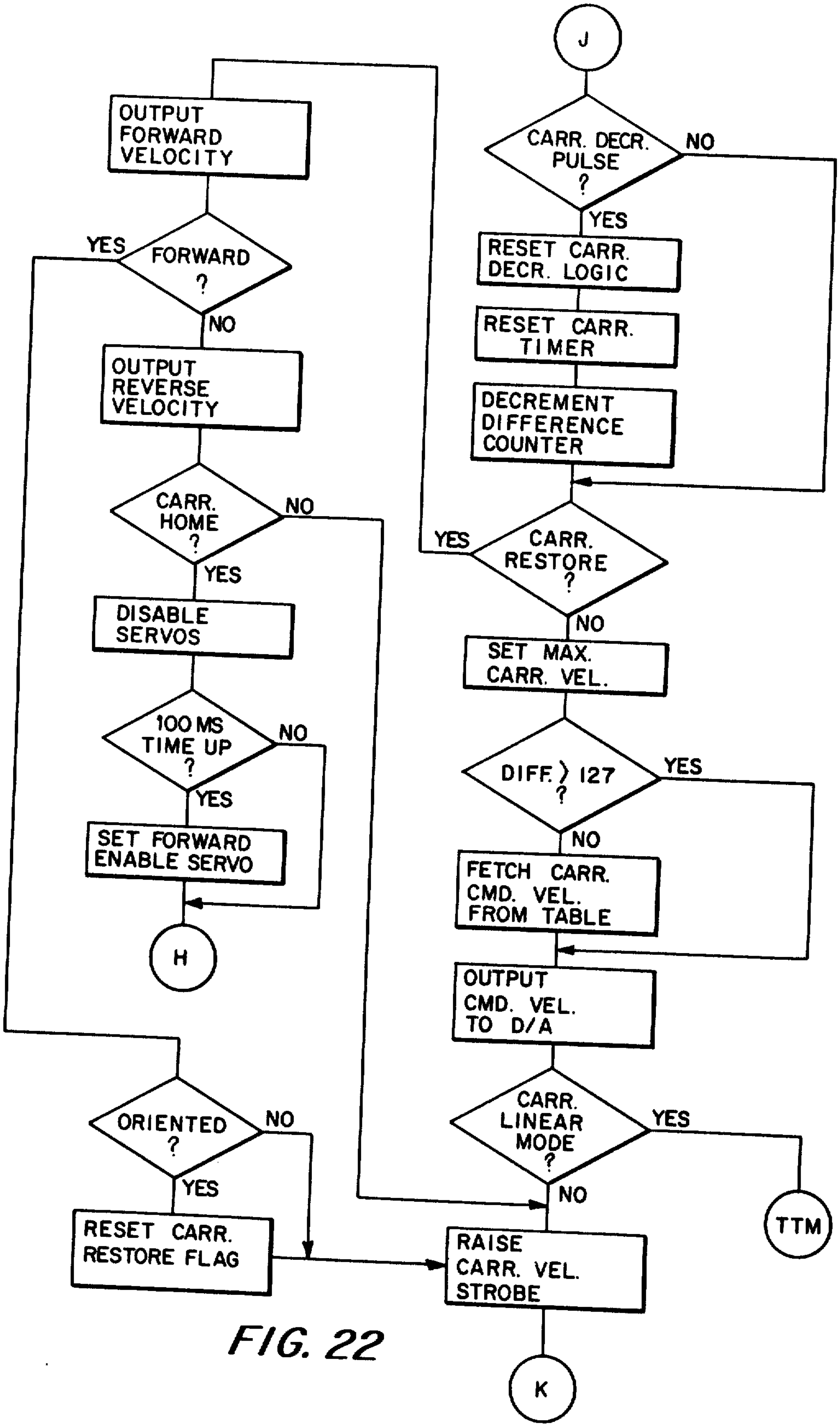

Referring to FIG. 22, the processor asks whether a CARR. DECR. pulse has occurred. If yes, the processor resets the carriage portion of increment-decrement logic 184, then resets the carriage 30ms timer, and then decrements the carriage difference software counter in RAM 272 by one. Thereafter, or if no CARR. DECR. pulse has occurred, the processor inquires whether a carriage restore in progress flag is set. If no, the processor sets a maximum normalized carriage command velocity latch and then inquires whether the difference stored in the carriage difference softward counter in RAM 272 is greater than 127. If no, the processor forwards the difference count from the RAM to the table ROM 266 to address the appropriate normalized CARR. COMMAND VELOCITY signal for the distance remaining to be traveled. Following this, such normalized CARR. COMMAND VELOCITY signal is forwarded to the D/A converter 88.

If the difference was originally detected to be greater than 127, then the maximum normalized CARR. COMMAND VELOCITY signal is forwarded to the D/A converter 88. The next operation after forwarding the appropriate command velocity to the D/A 88 is to inquire whether the carriage servo is in a position mode. If yes, the program branches to a TTM routine in FIG. 23. If no, the processor raises the CARR. STROBE signal and then program branches to a K routine depicted in FIG. 23.

Still referring to FIG. 22, if the answer to the question whether the carriage restore in progress flag was set was yes instead of no, then a predetermined forward normalized CARR. COMMAND VELOCITY signal is made ready to be forwarded to the D/A converter 88. This is done by calling out the velocity signal from a location in RAM 272 and storing it in operand register 260. When this is done, the processor asks whether the carriage has to move in reverse or forward, it being recalled that the restore-initialization process for the carriage is divided into two parts, i.e. reverse movement at a first velocity to the left-most boundary of movement, and then forward movement at a second velocity until CARR. HOME is no longer detected, at which point the carriage is commanded to move an additional distance corresponding to the occurrence of two CARR. DECR. pulses. Upon such occurrence, the carriage home position has been reached.

Now then, if the carriage still has to move in reverse, the forward normalized CARR. COMMAND VELOCITY signal is inhibited and a reverse normalized CARR. COMMAND VELOCITY signal is instead called up from RAM 272 and forwarded via requisite command data output latches 274 to the D/A converter 88. The processor then inquires as to whether CARR. HOME has been detected. If no, the CARR. STROBE signal is raised to gate the reverse normalized CARR. COMMAND VELOCITY signal into the S/H circuit 92 and then the program continues with routine K in FIG. 23. On the other hand, if CARR. HOME is detected, the servos are disabled. This is followed by the processor asking whether a 100ms software timer has elasped. If yes, the servos are enabled for forward carriage movement and then the program branches to that portion of the routine in FIG. 14 commencing with a question whether the paper feed in progress flag is set. If the 100ms time has not expired, the program immediately branches to the latter operation.

If the carriage is to be moved forward, the processor asks whether the carriage is "oriented", i.e. a CARR. HOME signal occurs coincident with a true CARR. EVEN signal. If this is not the case, the processor raises the CARR. STROBE in order to gate the forward normalized CARR. COMMAND VELOCITY signal into the S/H circuit 92. If yes, the processor resets the carriage restore flag and then raises the CARR. STROBE signal.

Figure 23:
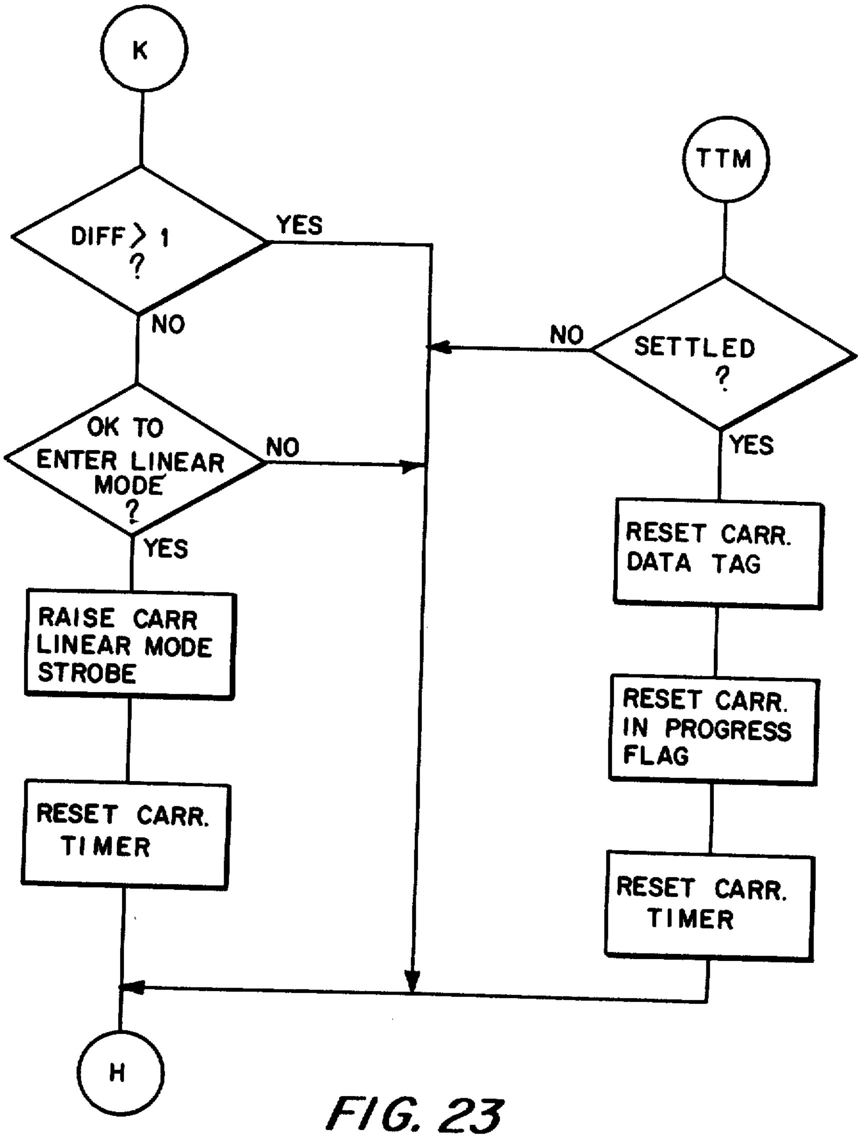

Referring now to FIG. 23, in accordance with the K routine, the processor asks whether the difference is greater than 1. If yes, the program branches to the portion of the routine in FIG. 14 alluded to above, i.e. questioning whether the paper feed in progress flag is set. If no, the processor next asks whether it is permissable to enter the position mode of operation. If no, the program branches to the routine in FIG. 14 as just described. If yes, the processor first raises the CARR. MODE CONTROL signal, then resets the carriage timer, and then executes that portion of the FIG. 14 routine starting with the question of whether the paper feed in progress flag is set.

In accordance with the TTM routine depicted in FIG. 23, the processor inquires whether the carriage is settled, or has finally stopped. If no, the program branches to the above-referenced portion of the FIG. 14 routine. If yes, the processor resets the carriage data tag latch 152 by means of decode logic 154, then resets the CIP flag, then resets the carriage timer and branches to the above-referenced portion of the FIG. 14 routine.

Figure 24:
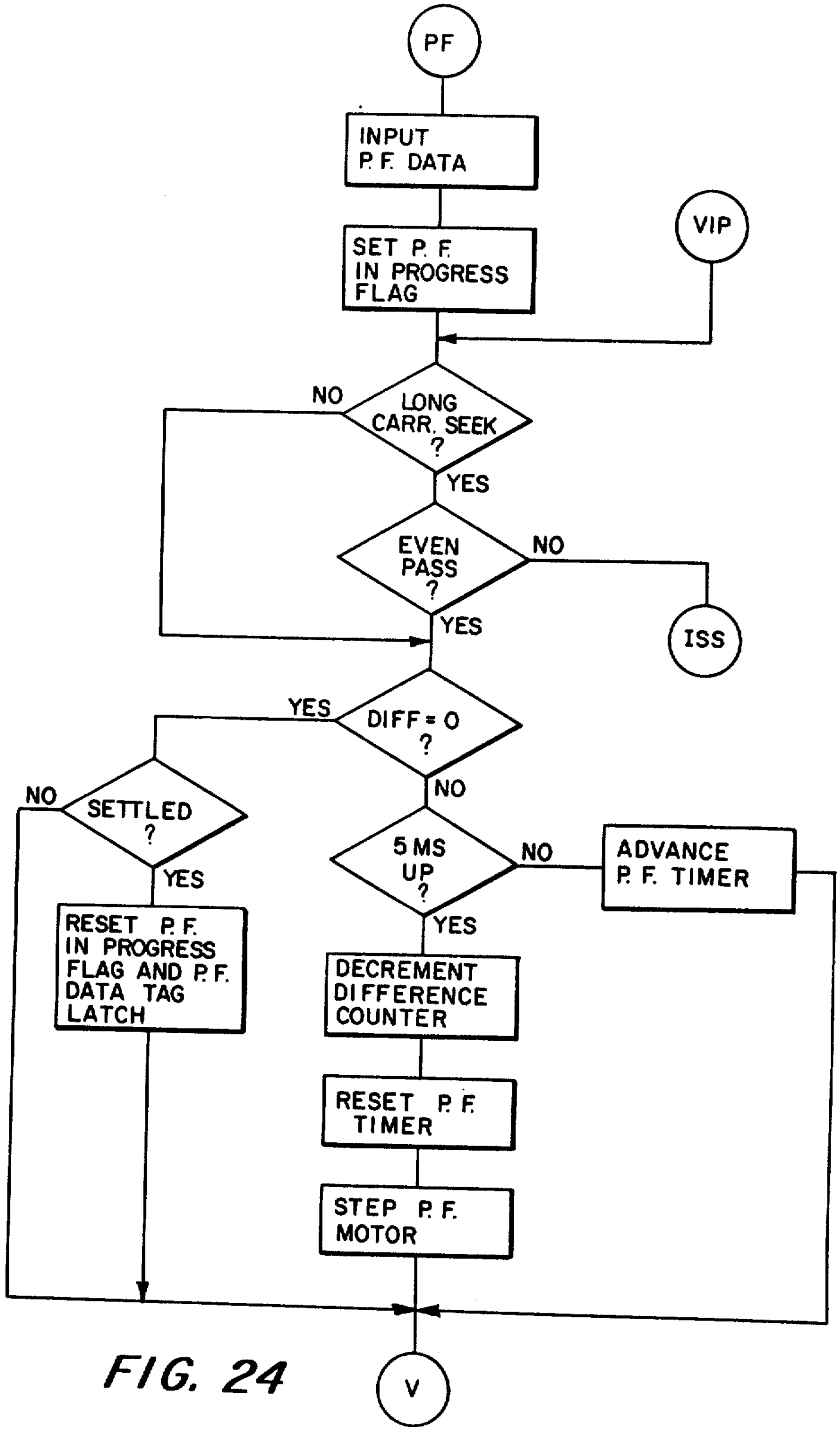

Referring now to the paper feed routine in FIG. 24, the processor first causes paper feed data stored in the data register 134 to be loaded into the operand register 260 and 262 and then forwarded through the ALU 268 for storage in RAM 272. Thereafter, the processor sets the paper feed in progress flag and then inquires as to whether the long carriage seek flag is set. If the long carriage seek flag is set, it means the carriage must move more than 127, 1/120th inch increments. Due to speed of carriage movement, the processor must service the carriage more often during its internal processing cycle. Accordingly, and if the long carriage seek flag is set, the processor inquires as to whether an odd or even processing cycle is being conducted, i.e. the first processing cycle is odd, the second is even, and so on.

If the internal processing cycle is odd, the processor bypasses the paper feed routine and returns to the input servo status routine in FIG. 11 in order to increase service to the carriage. Only when the processing cycle is even during a long carriage seek condition will the paper feed be "serviced," i.e. the paper feed routine executed to process received paper feed data. If the long carriage seek flag is not set, then the paper feed routine will always be executed during every internal processing cycle.

Assuming the processor is to execute the paper feed routine during the instant processing cycle thereof, the question is asked whether the difference that must be traversed by the paper feed apparatus is greater than zero. As with the carriage position data applied to the printer 10 from the host controller 124, the paper feed data is already representative of such difference. This difference data is loaded into an appropriate address location in RAM 272, being applied thereto from the operand registers 260 and 262 and through the ALU 268. Now then, if the difference is equal to zero, the processor asks whether the paper feed motor has "settled." If yes, the paper feed in progress flag and P.F. DATA TAG (or OPTION DATA TAG) are reset. This is followed by a branch to the routine depicted in FIG. 15. If the paper feed motor is not settled, the program immediately branches to the routine of FIG. 15.

If the difference is not equal to zero, the processor asks whether 5ms has expired, i.e. the time period following which the paper feed stepper motor is stepped one increment. Thus, if this time period has not expired, the processor continues to advance the paper feed 5ms timer and then branches to the routine of FIG. 15. If the 5ms time period has expired, the paper feed difference counter is decremented by one, then the paper feed timer is reset, and then the paper feed motor is stepped by raising the PAPER FEED CONTROL signal (FIG. 2). This is followed by a branch to the routine of FIG. 15.

Even though the presently preferred program for use with the processor 76 in printer 10 has been described in some detail, further details thereof may be obtained through a review of the program listing included as Appendix B to this application.

Although the present invention has been described with respect to a presently preferred embodiment, it will be appreciated by those skilled in the art that various modifications, substitutions, etc. may be made without departing from the spirit and scope of the invention as defined in and by the following claims.

What is claimed is:

1. In a serial printer comprising a carriage, a print member rotatably mounted to said carriage and including a plurality of character elements of a predetermined font style, drive means coupled to said print member for rotating said print member to a desired rotational position order to place a selected character element at a printing position adjacent a record medium to be printed upon, print hammer means mounted to said carriage and capable when enabled of impacting the character element located at said printing position with a desired level of force, and hammer control apparatus coupled to said print hammer means for enabling said print hammer means when said selected character element has been rotated to said desired rotational position, said hammer control apparatus comprising:

means responsive to a first signal representative of said selected character element to be impacted for generating a second signal proportional to a desired level of force with which said selected character element is to be impacted by said print hammer means when said plurality of character elements are defined in any one of at least two different font styles, one of which being said predetermined font style;

means coupled to said means for generating a second signal for multiplying said second signal by a constant identifying said predetermined font style to form a third signal representative of the desired level of force with which said selected character element is to be impacted; said means for multiplying including switch means capable of selectively attenuating said second signal by a predetermined amount for each of said at least two different font styles; said switch means including, a manually operable switch having a common contact and at least two selectable contacts, an amplifier having first and second inputs and an output, first impedance means for coupling the first input of said amplifier to said means for generating said second signal and to said common contact, second impedance means for coupling the second input of said amplifier to one of said selectable contacts, and means coupled to the output of said amplifier for generating said third signal;

means coupled to said print member for detecting when said selected character element has been rotated to said desired rotational position; and means responsive to such detection for coupling said third signal to said print hammer means thereby enabling said print hammer means to impact said selected character element with said desired level of force.

2. The serial printer of claim 1, wherein said means for generating said second signal includes a read-only-memory having a plurality of addressable memory locations each corresponding to a respective one of said plurality of character elements and each containing data constituting said second signal for said respective one character element.

3. The serial printer of claim 1, wherein said means for generating, said means for detecting and said means for coupling are all included in a data processing means.

4. The serial printer of claim 3, wherein said data processing means is a programmed microprocessor.

5. The serial printer of claim 1, wherein said predetermined amount of attenuation is different for each of said at least two different font styles.

6. The serial printer of claim 1, wherein said switch means further comprises third impedance means coupled between the first input of said amplifier and a second one of said selectable contacts.

7. The serial printer of claim 6, wherein said manual switch includes three selectable contacts with the third one being unconnected to either input of said amplifier.

8. The serial printer of claim 7, wherein said switch means further comprises fourth impedance means connected between the second input of said amplifier and ground.

9. The serial printer of claim 8, wherein each of said first, second, third and fourth impedance means is comprised of a resistor, the values of said resistors being mutually different.

10. In a serial printer comprising a carriage, a print member rotatably mounted to said carriage and including a plurality of character elements, drive means coupled to said print member for rotating said print member to a desired rotational position in order to place a selected character element at a printing position adjacent at least one record medium to be printed upon, print hammer means mounted to said carriage and capable when enabled of impacting the character element located at said printing position with a desired level of force, and hammer control apparatus coupled to said print hammer means for enabling said print hammer means when said selected character element has been rotated to said desired rotational position, said hammer control apparatus comprising:

means responsive to a first signal representative of said selected character element to be impacted for generating a second signal proportional to a desired level of force with which said selected character element is to be impacted by said print hammer means when any one or more of a predetermined number of record media are to be simultaneously printed upon, said any one or more record media including in number said at least one record medium;

means coupled to said means for generating a second signal for multiplying said second signal by a constant identifying said any one or more record media to form a third signal representative of the desired level of force with which said selected character element is to be impacted; said means for multiplying including switch means capable of selectively attenuating said second signal by a predetermined amount for each of said one or more record media; said switch means including a manually operable switch having a common contact and at least two selectable contacts, an amplifier having first and second inputs and an output, first impedance means for coupling the first input of said amplifier to said means for generating said second signal and to said common contact, second impedance means for coupling the second input of said amplifier to one of said selectable contacts, and means coupled to the output of said amplifier for generating said third signal;

means coupled to said print member for detecting when said selected character element has been rotated to said desired rotational position; and means responsive to such detection for coupling said third signal to said print hammer means thereby enabling said print hammer means to impact said selected character element with said desired level of force.

* * * * *